(12) United States Patent
Yasukawa

(10) Patent No.: US 10,887,484 B2
(45) Date of Patent: Jan. 5, 2021

(54) IMAGE FORMING APPARATUS, AND METHOD FOR CONTROLLING DISPLAY SCREENS THEREOF

(71) Applicant: CANON KABUSHIKI KAISHA, Tokyo (JP)

(72) Inventor: Akari Yasukawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 16/207,642

(22) Filed: Dec. 3, 2018

(65) Prior Publication Data

US 2019/0182399 A1    Jun. 13, 2019

(30) Foreign Application Priority Data

Dec. 7, 2017   (JP) .................. 2017-235539

(51) Int. Cl.
*H04N 1/00* (2006.01)
*G03G 15/00* (2006.01)

(52) U.S. Cl.
CPC ..... *H04N 1/00862* (2013.01); *G03G 15/5016* (2013.01); *H04N 1/00344* (2013.01)

(58) Field of Classification Search
CPC ........... H04N 1/00408; H04N 1/00413; H04N 1/00424; H04N 1/00514
See application file for complete search history.

(56) References Cited

U.S. PATENT DOCUMENTS

| | | | | |
|---|---|---|---|---|
| 2005/0053402 A1* | 3/2005 | Ishii | ...................... | G06F 3/1285 400/62 |
| 2005/0117948 A1* | 6/2005 | Hatta | ................. | H04N 1/00132 400/62 |
| 2008/0189598 A1* | 8/2008 | Yoshida | ................. | G03G 21/02 715/227 |
| 2009/0296131 A1* | 12/2009 | Yoshida | ............... | H04N 1/0035 358/1.15 |
| 2010/0253968 A1* | 10/2010 | Nuggehalli | ........... | G06F 3/1285 358/1.15 |
| 2011/0090530 A1* | 4/2011 | Kawakami | ............ | G06F 3/1238 358/1.15 |
| 2015/0055172 A1* | 2/2015 | Iida | ...................... | H04N 1/0083 358/1.15 |
| 2016/0308966 A1* | 10/2016 | Zhang | .................... | G06Q 10/00 |

FOREIGN PATENT DOCUMENTS

JP      2017-019197 A      1/2017

* cited by examiner

*Primary Examiner* — Benjamin O Dulaney
(74) *Attorney, Agent, or Firm* — Canon U.S.A., Inc., IP Division

(57) ABSTRACT

An image forming apparatus is provided and controls a display device to cause a display of an object associated with specific user information in a user selection screen to notify information relating to the number of pieces of specific print data associated with the specific user information.

25 Claims, 21 Drawing Sheets

■ USER REGISTRATION SCREEN

USER NAME: ⎕ ~501

PASSWORD: ⎕ ~502

MAIL ADDRESS: ⎕ ~503

ICON: ⎕ ~504

| CANCEL |~506        | OK |~507

■ USER EDIT SCREEN

USER NAME:    user1                    ~501

PASSWORD:    ****                      ~502

MAIL ADDRESS: user1@xxx.jp             ~503

ICON:        icon1                     ~504

| CANCEL |~506        | OK |~507

FIG.8A

800 DOCUMENT LIST SCREEN

PERSONAL PRINT

User1  801    805 DISPLAY ALL ▼

| DOCUMENT NAME | NUMBER OF PAGES | NUMBER OF COPIES | DATE |
|---|---|---|---|
| ☐ DOCUMENT 1.doc | 1 | 1 | 2015/06/09 15:52 |
| ☐ DOCUMENT 2.doc | 3 | 3 | 2015/06/09 16:10 |
|  |  |  |  |
|  |  |  |  |
|  |  |  |  |

[SELECT ALL] 802    [DELETE] 803    [START PRINTING] 804

FIG.8B

PERSONAL PRINT

User1  801    805 UNPRINTED ▼

| DOCUMENT NAME | NUMBER OF PAGES | NUMBER OF COPIES | DATE |
|---|---|---|---|
| ☐ DOCUMENT 2.doc | 3 | 3 | 2015/06/09 16:10 |
|  |  |  |  |
|  |  |  |  |
|  |  |  |  |
|  |  |  |  |

[SELECT ALL] 802    [DELETE] 803    [START PRINTING] 804

FIG.12

| NUMBER | USER NAME | NUMBER OF HELD JOBS | NUMBER OF UNPRINTED JOBS |
|---|---|---|---|
| 1 | User1 | 2 | 1 |
| 2 | User2 | 3 | 1 |
| 3 | User3 | 3 | 2 |
| 4 | User5 | 2 | 0 |

FIG.13

| DOCUMENT NAME | OWNER NAME | RECEPTION DATE | PRINT SETTING | PRINT STATE |
|---|---|---|---|---|
| DOCUMENT 1.doc | User1 | 201506091552 | NUMBER OF PAGES: 1, COLOR, 1in1, 1 COPY | PRINTED |
| DOCUMENT 2.pdf | User2 | 201506091309 | NUMBER OF PAGES: 4, MONOCHROME, 2in1, 2 COPIES | |
| DOCUMENT 10.pdf | User5 | 201506091926 | NUMBER OF PAGES: 6, TWO-COLOR, 4in1, 3 COPIES | PRINTED |
| DOCUMENT 4.doc | User3 | 201506091432 | NUMBER OF PAGES: 8, COLOR, 2in1, 4 COPIES | PRINTED |
| DOCUMENT 3.xls | User3 | 201506091101 | NUMBER OF PAGES: 1, MONOCHROME, 2in1, 5 COPIES | PRINTED |
| DOCUMENT 6.doc | User2 | 201506090945 | NUMBER OF PAGES: 9, COLOR, 1in1, 4 COPIES | |
| DOCUMENT 7.doc | User5 | 201506091614 | NUMBER OF PAGES: 6, MONOCHROME, 2in1, 2 COPIES | PRINTED |
| DOCUMENT 9.ppt | User3 | 201506091821 | NUMBER OF PAGES: 15, MONOCHROME, 4in1, 1 COPY | |
| DOCUMENT 11.ppt | User2 | 201506091914 | NUMBER OF PAGES: 14, COLOR, 2in1, 5 COPIES | PRINTED |
| DOCUMENT 2.doc | User1 | 201506091610 | NUMBER OF PAGES: 3, COLOR, 2in1, 3 COPIES | |

FIG.14

| USER NAME 1401 | PASSWORD 1402 | MAIL ADDRESS 1403 | ICON IMAGE 1404 | AUTHORITY 1405 | LATEST LOGIN DATE 1406 | REGISTRATION DATE 1407 |
|---|---|---|---|---|---|---|
| User1 | ***** | user1@xxx.jp | icon1 | Administrator | 201506091500 | 201403051300 |
| User2 | ***** | user2@xxx.jp | icon2 | General User | 201506031500 | 201403051300 |
| User3 | ***** | user3@xxx.jp | icon3 | Power User | 201506011500 | 201403051300 |
| User4 | ***** | user4@xxx.jp | icon4 | General User | 201506061500 | 201406061300 |
| User5 | ***** | user5@xxx.jp | icon5 | General User | 201506071500 | 201410051300 |
| User6 | ***** | user6@xxx.jp | icon6 | General User | 201506081500 | 201410051300 |

IMAGE FORMING APPARATUS, AND METHOD FOR CONTROLLING DISPLAY SCREENS THEREOF

BACKGROUND

Field

The present disclosure relates to a system including a cloud authentication service, and to a method of controlling the system.

Description of the Related Art

An image forming apparatus such as a multifunctional peripheral (hereinafter, referred to as MFP) has been known as an apparatus performing printing. Some of the MFPs include a hold printing function that executes image formation based on accumulated print data at timing instructed by a user (Japanese Patent Application Laid-Open No. 2017-019197). The image forming apparatus discussed in Japanese Patent Application Laid-Open No. 2017-019197 further includes a function of identifying an operation user with use of a user icon selection screen. The image forming apparatus discussed in Japanese Patent Application Laid-Open No. 2017-019197 identifies the operation user, thereby enabling display of a list of print data associated with the identified user. When the user selects target print data from the list to instruct the printing, the printing is started.

SUMMARY

Embodiments disclosed herein are directed to an image forming apparatus that enables checking for presence/absence of print data associated with a user without requiring an operation of displaying a list of the print data associated with the user.

Further, embodiments disclosed herein are directed to an image forming apparatus that enables checking for the number of pieces of print data associated with a user without requiring an operation of displaying a list of the print data associated with the user.

According to an aspect of the present disclosure, an image forming apparatus includes a display, at least one memory, and at least executes instructions stored in the memory to configure the image forming apparatus, to acquire user information associated with an object selected in a user selection screen in which a plurality of objects associated with user information is arranged, to display, on the display, a screen presenting a list of print data that can be printed according to an instruction and is associated with the acquired user information, and to control the image forming apparatus to cause a display of the object associated with specific user information in the user selection screen to notify information relating to a number of pieces of specific print data associated with the specific user information.

Further features will become apparent from the following description of exemplary embodiments with reference to the attached drawings.

BRIEF DESCRIPTION OF THE DRAWINGS

FIG. 5A is a diagram illustrating a user registration screen, and FIG. 5B is a diagram illustrating a user edit screen.

FIG. 8A is a diagram illustrating a document list screen of all documents being held, and FIG. 8B is a diagram illustrating a document list screen of unprinted documents being held.

FIG. 12 is a diagram illustrating a list of document holding users that is managed by a personal print application.

FIG. 13 is a diagram illustrating bibliographic information about documents being held that is managed by the personal print application.

FIG. 14 is a diagram illustrating a user table that is managed by a login application.

DESCRIPTION OF THE EMBODIMENTS

As described above, the image forming apparatus discussed in Japanese Patent Application Laid-Open No. 2017-019197 displays the list of print data after a user icon is selected. Therefore, the user can check presence/absence of the print data which the user can instruct to print, in particular, the number of pieces of print data, only when the list of print data is displayed. In other words, the user using the image forming apparatus discussed in Japanese Patent Application Laid-Open No. 2017-019197 cannot figure out presence/absence of print data which can be printed according to an instruction, in particular, the number of pieces of print data which can be printed according to an instruction until the user selects the user icon. Accordingly, for example, in a case where the print data is transmitted from a personal computer (PC) to the image forming apparatus and is newly registered, the image forming apparatus discussed in Japanese Patent Application Laid-Open No. 2017-019197 requires an operation to select the user icon and to display the list of print data to check whether the new print data has been normally registered.

Exemplary embodiments are specifically described below and the claims are not limited to contents described in the exemplary embodiments. Configurations in the exemplary embodiments may be replaced with equivalents which achieve similar effects.

<Print System>

Figure 1A:
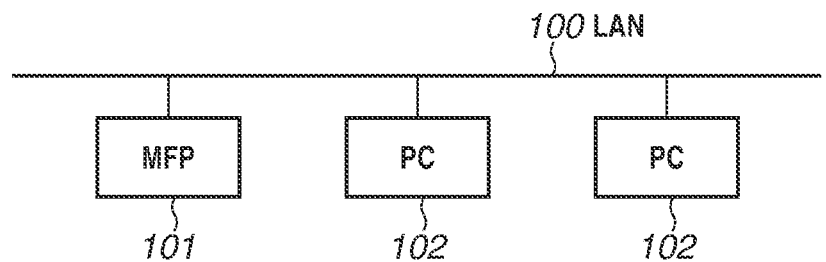
FIG. 1A is a diagram illustrating a configuration of a print system.

A system configuration of a first exemplary embodiment is described with reference to FIG. 1A. A print system 1 is an image forming system that forms an image on a sheet based on print data. The print system 1 includes a multifunctional peripheral (MFP) 101 and a PC 102 that are communicably connected by a local area network (LAN) 100.

The PC 102 performs a function of generating print data written in a page description language and transmitting the print data to the MFP 101, with use of a printer driver. The MFP 101 performs a print function of receiving and printing the print data transmitted from the PC 102. The PC 102 is an example of an external apparatus, and the MFP 101 is an example of the image forming apparatus.

The MFP 101 includes a hold printing function that suppresses information leakage that occurs when a printed document is left unattended in the MFP 101. The hold printing function is a function which does not immediately print the print data transmitted from the PC 102 at the time of receiving the print data and accumulating it as a held document in a storage (e.g. hard disk inside) the MFP 101. In order to use the hold printing function, the user previously transmits the print data from the PC 102 to the MFP 101. Thereafter, the user goes to a place where the MFP 101 is installed and performs print start operation through an operation unit of the MFP 101. When the print start operation is received, the MFP 101 starts the print operation. As described above, in the hold printing function, a printed document is output while the user is present near the MFP 101. Therefore, the hold printing function makes it possible to prevent information leakage caused by erroneous pickup of the printed document and ensures good security. Further, a paper document is prevented from being left, which makes it possible to suppress wasteful printing.

Figure 1B:
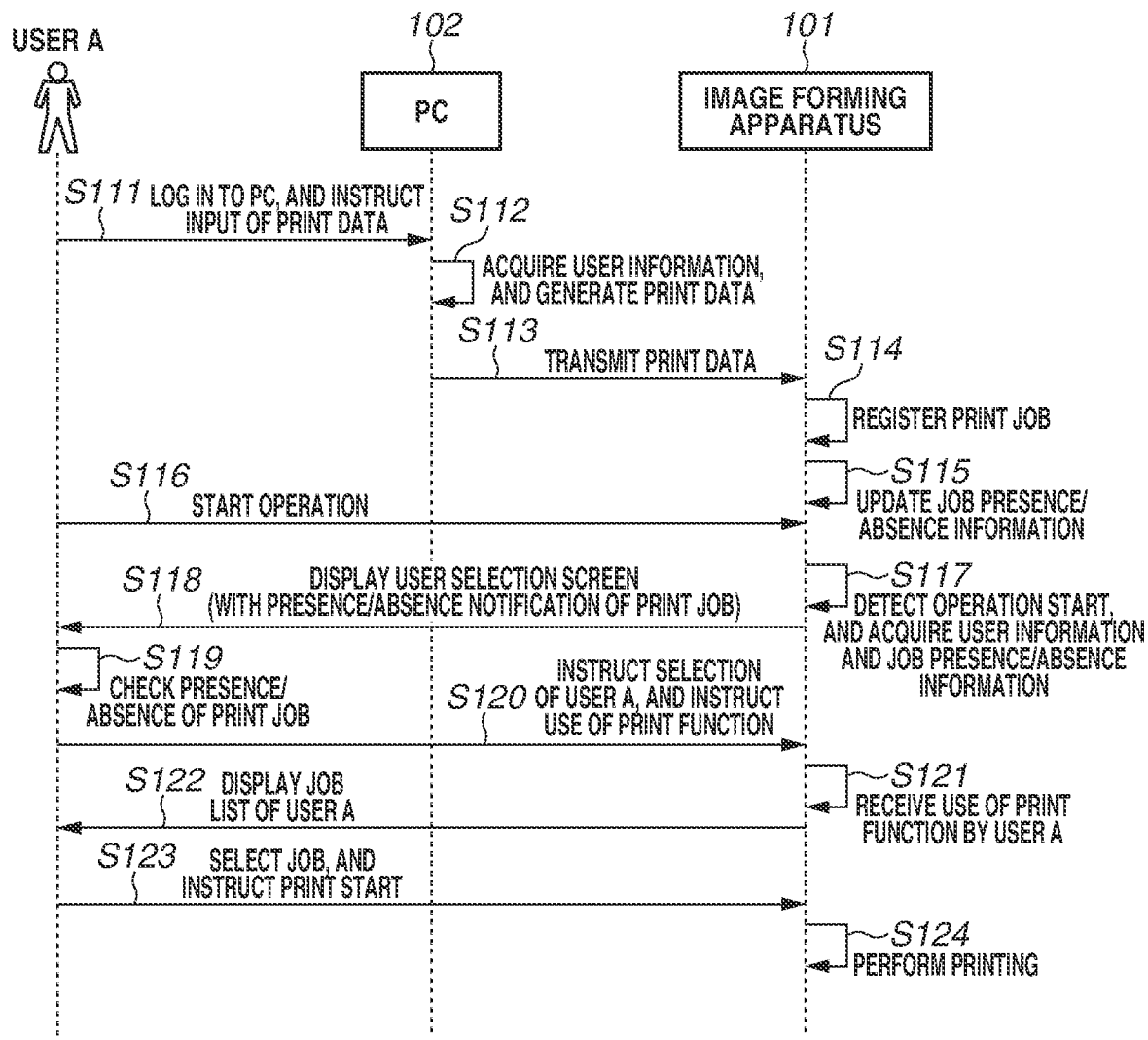
FIG. 1B is a diagram illustrating a sequence of the print system.

A print processing sequence by the print system 1 is specifically described. FIG. 1B is a diagram illustrating the processing sequence by the print system 1.

In a case where the hold printing is performed in the print system 1, a user A first logs in to the PC 102 and operates the printer driver. In step S111, the user A specifies a document to be printed and an MFP to be used for printing, and instructs execution of requested printing. When the instruction is received from the user, the printer driver generates print data based on the document. Further, in step S112, the printer driver acquires user information (user name) of the logging in user to add the user information to the print data. The user information may be previously input to the printer driver by the user. After that, in step S113, the PC 102 transmits the generated print data to the MFP 101. When receiving the print data, in step S114, the MFP 101 registers a print job based on the print data. Further, in step S115, the MFP 101 identifies an owner of the print data from the user information added to the print data, and updates job presence/absence information of the user. Thereafter, in step S116, the user A comes close to the MFP 101 and starts the operation. When detecting the operation by the user A, in step S117, the MFP 101 acquires the user information and job information. In step S118, the MFP 101 displays a user selection screen based on these information. In step S119, the user A checks presence/absence of own job from a display state of the user selection screen. The user A that has checked presence of the job, selects an icon corresponding to the user A in the user selection screen, and then selects a print function in step S120. In step S121, the MFP accepts the selection of use of the print function from the user A, and accordingly displays a list of print jobs associated with the user A in step S122. The user A selects a desired print job from the list, and gives a print instruction in step S123. In step S124, the MFP 101 starts printing according to the print instruction.

As described above, according to the print system 1, the user can figure out whether the own job has been registered before selection of the user icon. Therefore, it is possible to reduce an unnecessary work caused by erroneously displaying the job list in a state where the job is not registered.

<Hardware Configuration>

Figure 2:
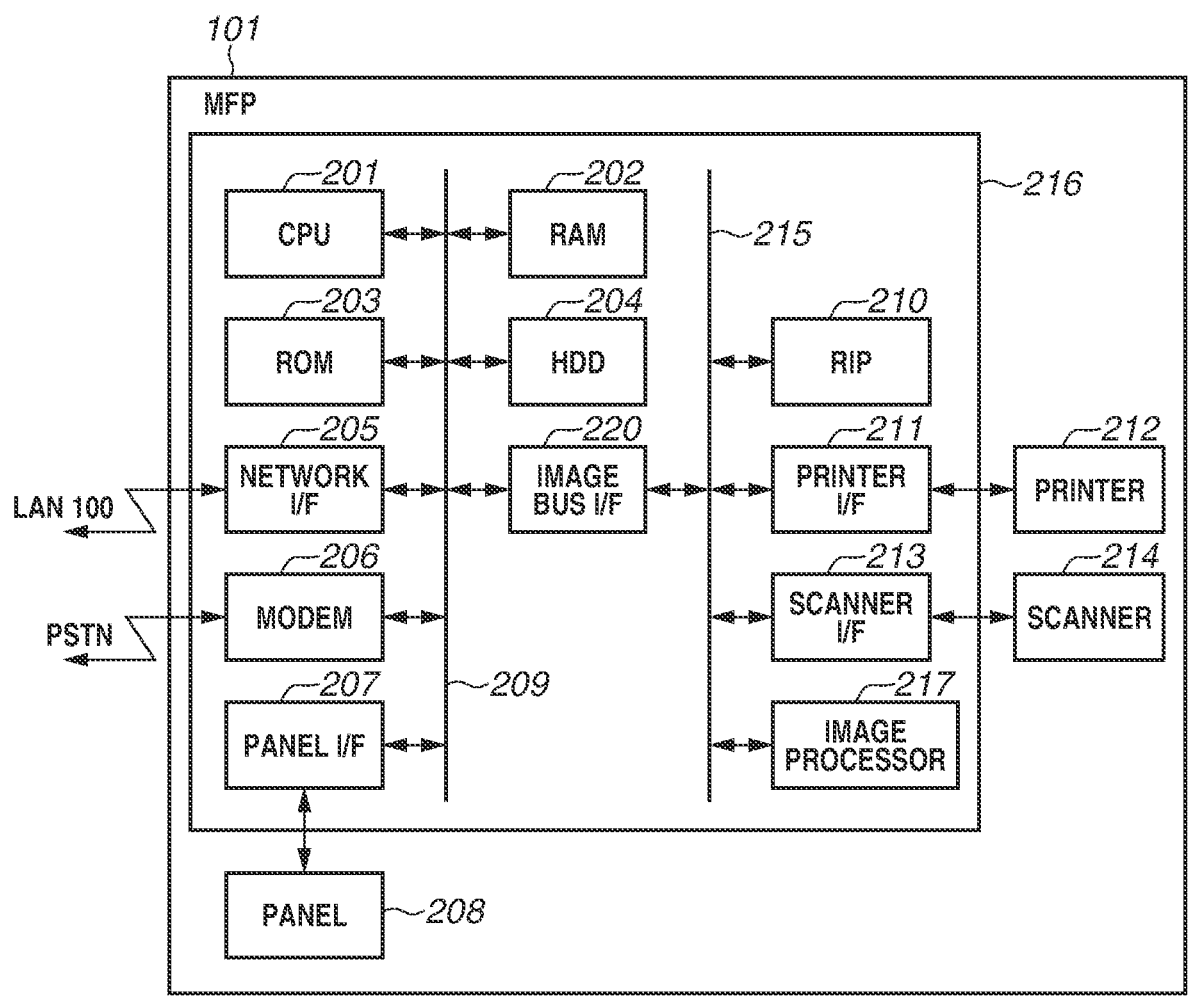
FIG. 2 is a diagram illustrating a configuration of hardware of a multifunctional peripheral (MFP).

FIG. 2 is a diagram illustrating a hardware configuration of the MFP 101. The MFP 101 includes a controller unit 216, a printer unit 212, a scanner unit 214, and an operation unit 208. The controller unit 216 is connected to the LAN 100 or a public line (e.g., public switched telephone network (PSTN) or integrated services digital network (ISDN)), and performs input/output of image data and device information.

The printer unit 212 is a device that prints raster image data on a sheet. The method therefor includes an electrophotographic method using a photosensitive drum and a photosensitive belt, and an inkjet method that discharges ink from a minute nozzle array to directly print an image on a sheet. The printer unit 212 starts print processing in response to an instruction from a central processing unit (CPU) 201. The printer unit 212 includes a plurality of sheet feeding stages so that different sheet sizes or different sheet directions can be selected. Further, as an additional function of the printer unit 212, there is a finishing function. A finishing mechanism is called finisher, etc. The finishing mechanism includes mechanisms for sorting the printed documents in units of copy, bundling the printed documents by a stapler, and folding the printed documents.

The scanner unit 214 is a device that illuminates an image on a paper document, and scans the image using a charge-coupled device (CCD) line sensor to convert the image into an electric signal as raster image data. The scanner unit 214 performs an operation for reading the document sheet under control of the CPU 201 in response to a reading start instruction from the operation unit 208 sent by the user.

The operation unit 208 includes a liquid crystal display (LCD, display device) that can display information, and a touch panel sheet is stuck to the LCD. The operation unit 208 displays an operation screen with use of the LCD, and detects a touch operation performed by the user through the touch panel sheet. When a key of the operation screen is pressed (is touched by finger, etc.), the operation unit 208 transmits positional information thereof to the CPU 201 through an operation unit interface 207. Further, the operation unit 208 includes various kinds of operation keys (hardware keys) such as a start key, a stop key, an identification (ID) key, and a reset key.

The controller unit 216 is a device that controls the MFP 101. The controller unit 216 includes the CPU 201, a random access memory (RAM) 202, a read-only memory (ROM) 203, a hard disk drive (HDD) 204, a network interface (Network I/F) 205, a modem (MODEM) 206, the operation unit interface (PANEL I/F) 207, and an image bus interface (IMAGE BUS I/F) 220. These units are connected to a system bus 209. Further, the controller unit 216 includes a raster image processor (RIP) 210, a printer interface (PRINTER I/F) 211, a scanner interface (SCANNER I/F) 213, and an image processor (IMAGE PROCESSOR) 217. These units are connected to an image bus 215 that transfers image data at high speed.

The CPU 201 is a processor that controls the MFP 101. The RAM 202 is a system network memory for operation of the CPU 201, and also serves as a program memory for recording programs and as an image memory for temporarily recording image data. The ROM 203 holds a system boot program and various kinds of control programs. The HDD 204 is a hard disk drive and holds various kinds of programs for controlling the system, image data, user information necessary for user authentication and user identification, etc.

The operation unit interface 207 is an interface unit for the operation unit (PANEL) 208, and outputs data to be displayed to the operation unit 208. The operation unit interface 207 transmits information input by the user through the operation unit 208, to the CPU 201.

The network interface 205 is connected to the LAN 100, and performs data input/output with the PC 102 and other external apparatus. The modem 206 is connected to the public line such as PSTN, and performs data input/output such as FAX transmission/reception.

The image bus interface 220 is a bus bridge that connects the system bus 209 and the image bus 215, and converts a data structure. The image bus 215 includes a peripheral component interconnect (PCI) bus or an IEEE 1394 bus. The raster image processor 210 rasterizes print data into bitmap image. The printer interface 211 connects the printer unit (PRINTER) 212 and the controller unit 216, and performs synchronous/asynchronous conversion of image data. The scanner interface 213 connects the scanner unit (SCANNER) 214 and the controller unit 216, and performs synchronous/asynchronous conversion of image data. The image processor 217 performs correction, processing, editing, etc. on input image data, and performs printer correction, resolution conversion, etc. on print output image data. Further, the image processor 217 performs rotation of image data, performs compression/decompression processing of Joint Photographic Experts Group (JPEG) on multivalued image data, and performs compression/decompression processing of Joint Bi-level Image Experts Group (JBIG), Modified Modified READ (MMR), Modified Huffman (MH), etc. on binary image data.

With the above-described configuration, the MFP 101 can accumulate, as a held document, the print data transmitted from the PC 102 through the LAN 100, and perform print output of the held document in response to a print start instruction from the user.

<Software Configuration>

Figure 3:
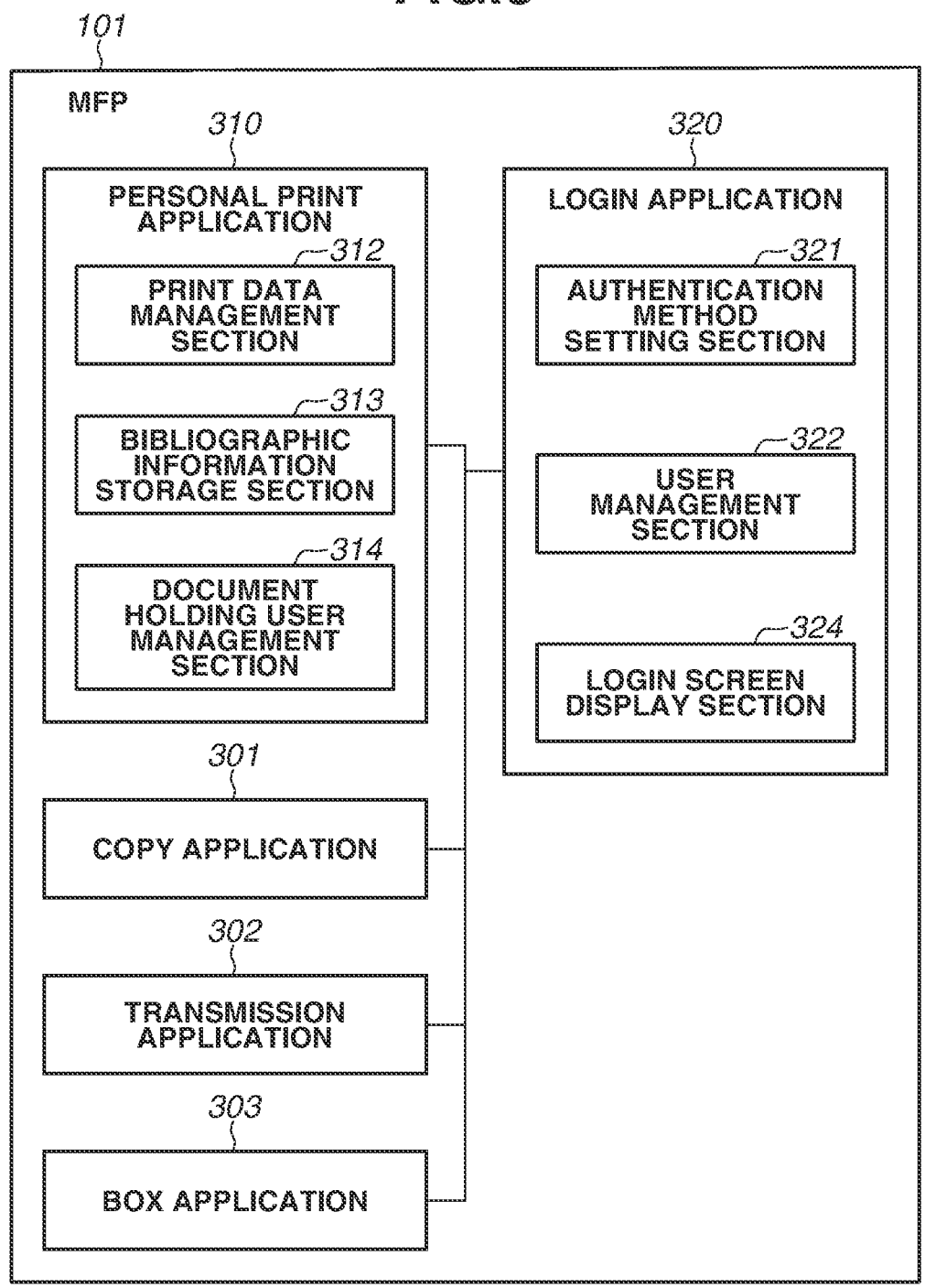
FIG. 3 is a diagram illustrating a configuration of software of the MFP.

FIG. 3 is a block diagram illustrating a software configuration of the MFP 101. The MFP 101 includes a copy application 301, a transmission application 302, a box application 303, a personal print application 310, and a login application 320.

The copy application 301 is an application that controls the scanner unit 214 and the printer unit 212, and executes copy. The transmission application 302 is an application that controls the scanner unit 214, the network interface 205, and the modem 206, and transmits image data of a scanned document to the outside through an electronic mail, a facsimile, etc. The box application 303 controls the scanner unit 214 and the network interface 205. The box application 303 is an application that saves, in the HDD 204, the image data of the scanned document and the image data received through the network interface 205, for their reuse. Further, the box application 303 controls the printer unit 212 and prints the saved image data. The personal print application 310 is an application that accumulates print data transmitted from the PC 102 in the HDD 204 as a held document, displays a list of held documents of a login user, and executes print processing of a document selected from the list. The login application 320 is an application that executes user authentication and processing relating to login.

In the present exemplary embodiment, the personal print application 310 as an example of a print control unit and the login application 320 as an example of a login control unit are described in detail because the two applications are particularly important.

The personal print application 310 is first described. The personal print application 310 includes a print data management section 312, a bibliographic information storage section 313, and a document holding user management section 314. The print data management section 312 performs control to store a document transmitted from the PC 102 in the HDD 204 and to manage the document. The bibliographic information storage section 313 performs control to extract print setting, an owner name (owner information), etc. written in the print data transmitted from the PC 102, and to store the extracted information in the HDD 204 as bibliographic information illustrated in FIG. 13. As the bibliographic information, a document name, an owner name, a reception date, print setting, and information indicating printed or unprinted are stored. The document holding user management section 314 manages the owner name (owner information) extracted from the print data transmitted from the PC, as information for identification of the user holding the held document (hereinafter, referred to as document holding user information). As illustrated in FIG. 12, the document holding user information includes information of the user name, the number of held jobs, and the number of unprinted jobs. The number of held jobs indicates the number of documents held by the user, and the number of unprinted jobs indicates the number of unprinted and held documents among the held jobs. In other words, among the bibliographic information illustrated in FIG. 13, the number of jobs held by each user is the number of held jobs, and the number of jobs that have not been printed among the jobs held by each user is the number of unprinted jobs. Further, when the print data is deleted after printing or is deleted according to an instruction by the user, the user of the document holding user information is deleted together with the deletion of the print data. In other words, when the number of jobs held by the user becomes zero, the user is deleted from the list. Further, when printing of the unprinted print data is executed, the number of unprinted jobs in the document holding user information is varied.

It is particularly important that the document holding user information is managed not by the login application 320 but by the personal print application 310. The document holding user information is dynamic information that is frequently updated upon input and deletion of the document. If such dynamic information is managed by the login application 320, it is necessary for the personal print application 310 to frequently issue update notification to the login application 320. Accordingly, the present exemplary embodiment adopts the configuration in which the personal print application 310 manages the document holding user information.

Next, the login application 320 is described. The login application 320 includes an authentication method setting section 321, a user management section 322, and a login screen display section 324. The authentication method setting section 321 sets an authentication method. In the present exemplary embodiment, two authentication methods are described. One of the authentication methods is a keyboard authentication method using a user name and a password that are input by the user through a keyboard of the operation unit 208. The other authentication method is an icon selection method that permits login of the user through selection of a user icon displayed in an icon selection screen. Other authentication methods include a card authentication method using an integrated circuit (IC) card, and a biometric authentication method in which an individual is identified based on human physical characteristics such as vein; however, description of these methods is omitted. The icon selection method is particularly important in the present exemplary embodiment.

The icon selection method is a method in which the login application 320 displays, as a list, user names registered in the user table and icon images corresponding to the respective user names, in the login screen of the operation unit 208. According to the method, the user can easily log in only by selecting own icon in the login screen. In this login method, the user is permitted to log in to the MFP 101 without inputting individual information such as a user name and a password. In other words, strict user authentication is not performed. Accordingly, the icon selection method is inferior to the above-described keyboard authentication method in terms of security. On the other hand, the method is advantageous in that the login user can be specified through simple operation. Accordingly, the method is effective to a case where the user logs in only by selecting the user name, and a customized function (also referred to as personalized function) of the MFP corresponding to the login user is provided.

The user management section 322 manages the user identification information of the user who is permitted to log in to the MFP 101. The user management section 322 manages the user accounts registered in the user table of FIG. 14, namely, a user name 1401, a password 1402, a mail address 1403, an icon image 1404, authority 1405, a latest login date 1406, and a registration date 1407. The configuration in which the password 1402 is registrable has been described; however, the password may not be registered in a case where login is easily permitted in the above-described icon selection method.

In the present exemplary embodiment, the user account may be previously registered by a dedicated system administrator, or each user may register own user account. For registration of each user, a registration method illustrated in FIG. 4A is provided.

Figure 4A:
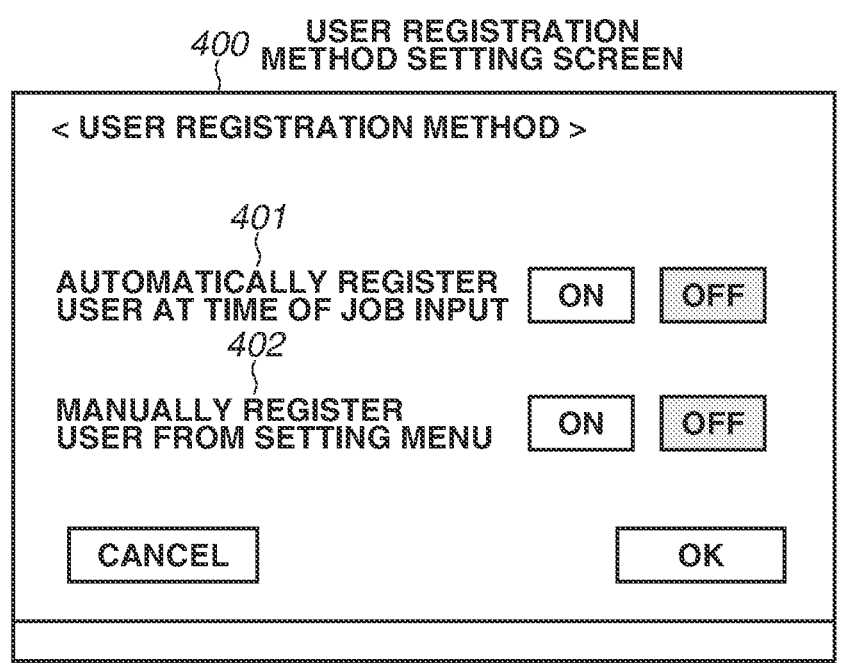
FIG. 4A is a diagram illustrating a user registration method setting screen.

FIG. 4A illustrates a user interface (UI) screen for setting a user account registration method. The screen of FIG. 4A is displayed on the operation unit 208 by the CPU 201. As illustrated in a setting screen 400 of FIG. 4A, the user registration method includes a first registration method 401 for "automatic registration at job input" and a second registration method 402 for "manual registration from setting menu".

In the first registration method 401, when the print data is received, the owner name (owner information) included in the print data is registered in the user table of FIG. 14. In a case where the first registration method 401 is enabled, when the print data is received, the owner of the print data is automatically added as a user account. Even when the print data is deleted from the MFP 101, the user account is not deleted.

Figure 4B:
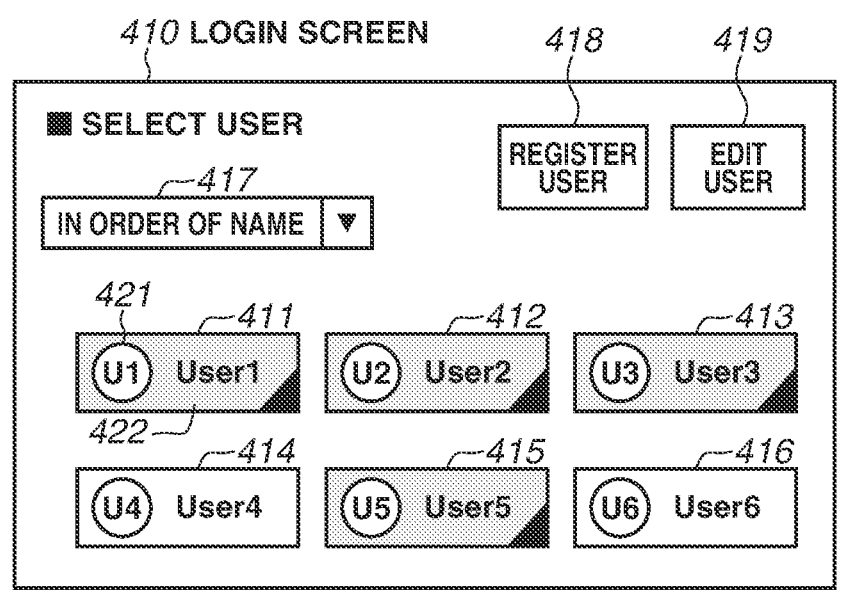
FIG. 4B is a diagram illustrating a login screen.

In the second registration method 402, each user manually registers user identification information from a user registration button 418 in a login screen 410 of FIG. 4B.

The two registration method are each enabled or disabled by the dedicated system administrator through the screen of FIG. 4A.

The login screen display section 324 executes display control of the login screen. For example, in a case where the keyboard authentication method is set in the authentication method setting section 321, an authentication screen including a message of "input user name and password" is displayed. In a case where the icon selection method is set as the authentication method, the login screen as illustrated in FIG. 4B described below is displayed on the operation unit 208.

The above is description of the software configuration of the MFP 101. In the present exemplary embodiment, the personal print application 310 manages the document holding user information, and the login application 320 manages the user accounts. Further, the login application 320 acquires the document holding user information from the personal print application 310 when displaying the login screen. In addition, the login application 320 changes the method of displaying the user icons of the respective users based on the acquired document holding user information.

<Example of User Icon Selection Screen>

The UI screen displayed on the operation unit 208 by the login screen display section 324 in the case where the icon selection method is set is described with reference to FIG. 4B. The login screen 410 is displayed when the MFP 101 is activated or immediately after logout. The display timing of the login screen 410, however, is not limited thereto. A plurality of user icons for identification of users is arranged in the login screen 410.

User icons 411 to 416 are selection objects to identify respective users who are permitted to log in to the MFP 101. An image 421 included in the user icon 411 corresponds to an icon image 1404 registered in the user table of FIG. 14, and a user name (user ID name) 422 corresponds to a user name 1401 registered in the user table. The user can easily log in by selecting only any of displayed user icons 411 to 416. In the present exemplary embodiment, up to six user icons are displayable in one screen. In a case where icons corresponding to all of the users are not displayable in one screen, the screen can transition by flick operation and next user icon is displayed. In FIG. 4B, the user icons 411, 412, 413, and 415, and the user icons 414 and 416 are differently displayed. This is because the icon image of the document holding user among the users registered in the user table is changed to an icon image notifying holding of the documents in the login screen 410. The detail thereof is described below.

The user registration button 418 is a button for newly registering a user account. The user registration button 418 is displayed only in a case where the second registration method 402 in FIG. 4A is enabled. When the user registration button 418 is pressed, the screen transitions to a user registration screen 500 of FIG. 5A in which a user name 501, a password 502, a mail address 503, and an icon 504 are registrable. After the registration work is completed, a user account is newly added to the user table of FIG. 14. The user name 501 is an example of the identification information for identifying a user who is permitted to log in. The user name 501 is a required item, and the password 502, the mail address 503, and the icon 504 are optional items.

A user edit button 419 of FIG. 4B is a button for editing the user account that has been registered. When the user edit button 419 is pressed, the screen transitions to a user edit screen 510 of FIG. 5B in which items other than the user name 501, namely, the password 502, the mail address 503, and the icon 504 can be added or edited.

A sort button 417 in FIG. 4B is a button for sorting and displaying the user icons. When "in order of name" is selected by the sort button 417, the user names registered in the user table are sorted and displayed in order of name. In addition, for example, "in order of registration" is selectable by the sort button 417.

<Example of Application Selection Screen>

Figure 6:
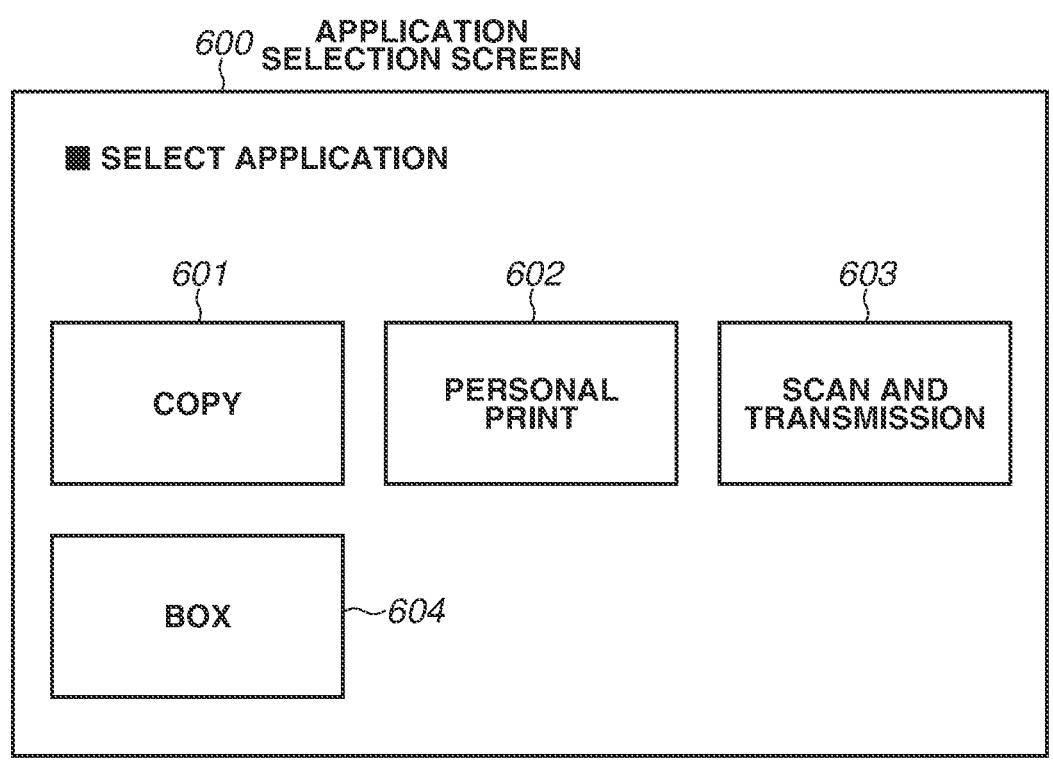
FIG. 6 is a diagram illustrating an application selection screen.

FIG. 6 illustrates an application selection screen. An application selection screen 600 is displayed in a case where any of the user icons is selected in the login screen 410.

In the application selection screen 600, buttons 601, 602, 603, and 604 are displayed. The buttons 601, 602, 603, and 604 respectively correspond to the copy application 301, the personal print application 310, the transmission application 302, and the box application 303.

<Example of Document List Screen>

When the button 602 corresponding to the personal print application 310 is pressed in the application selection screen 600, a held document list screen 800 illustrated in FIGS. 8A and 8B is displayed. A case where the user icon 411 has been selected in the login screen 410 is described as an example.

In FIG. 8A, only documents of the login user are displayed in the held document list screen 800 in order to allow the login user to easily find own document. In a held document list 801, print setting of the held document, a reception date of the print data, etc. that are held by the bibliographic information storage section 313 in association with User 1 as the login user are displayed. When instructing printing of the held document, the user selects an optional document from the held document list displayed in the held document list 801, and then presses a print start button 804. Further, when instructing deletion of the held document, the user may select an optional held document, and then press a deletion button 803 to delete the optional held document from the print data management section 312. In selection of the held document, the held document may be selected one by one, or all of the held documents may be collectively selected through press of an all selection button 802 to perform desired operation.

A document filter button 805 is a button for filtering and displaying the held documents. When "display all" is selected by the document filter button 805, all of documents printable according an instruction and held by the user are displayed as illustrated in FIG. 8A. In contrast, when "unprinted" is selected by the document filter button 805, only a document that has not been printed, is displayed from among the documents held by the user as illustrated in FIG. 8B. Whether the held document has been printed is registered in the bibliographic information illustrated in FIG. 13.

<Operation at Activation>

Figure 9:
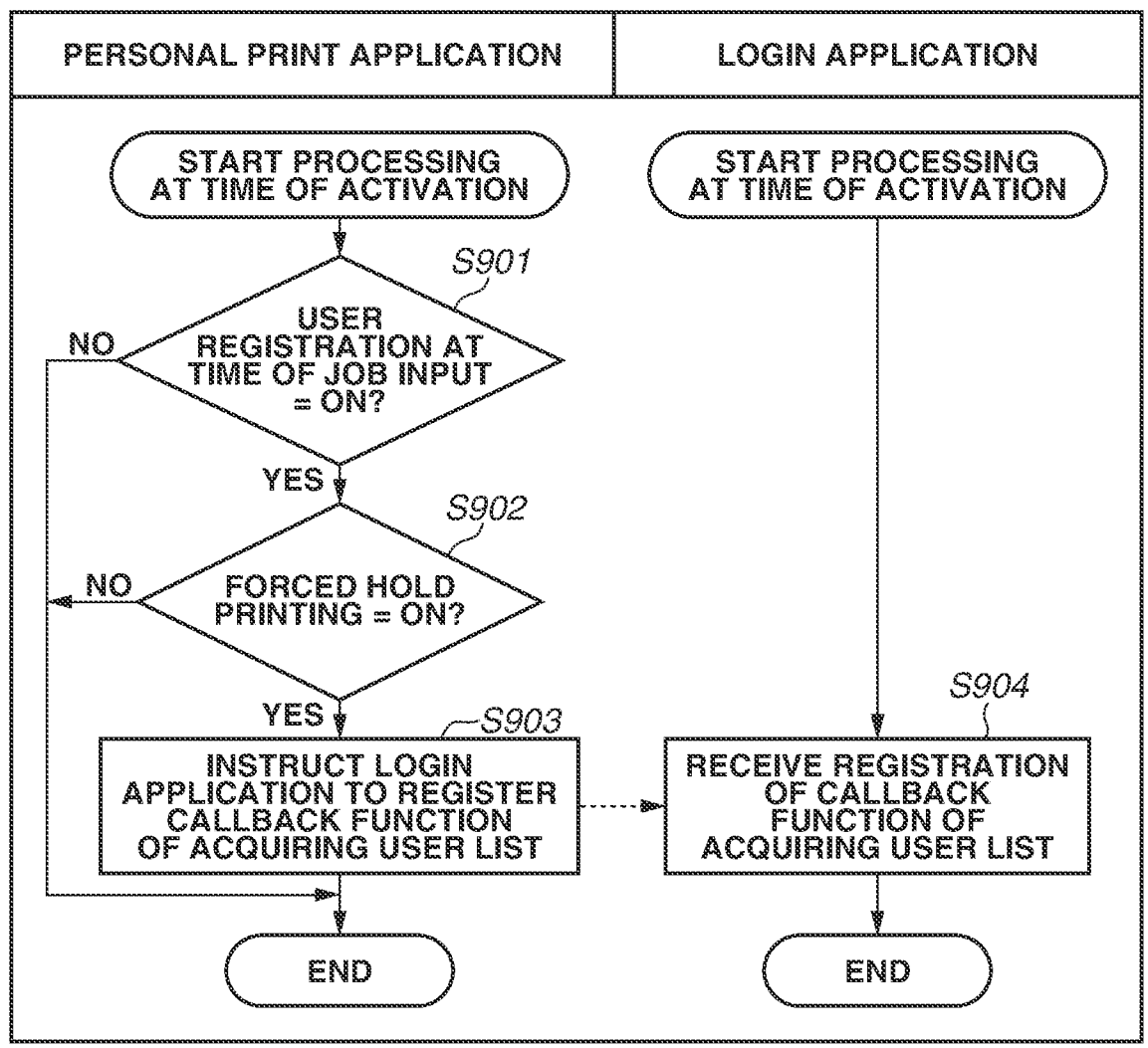
FIG. 9 is a diagram illustrating a processing flow at the time of activation of the MFP.

FIG. 9 is a flowchart for registering a callback function to acquire a list of users holding held documents. The function is executed at activation. A program executing steps illustrated in the flowchart of FIG. 9 is held by the ROM 203 or the HDD 204. Further, the steps are executed by the CPU 201.

In step S901, the personal print application 310 first acquires setting of the MFP 101 during activation processing, and determines whether following two settings are enabled.

Figure 7:
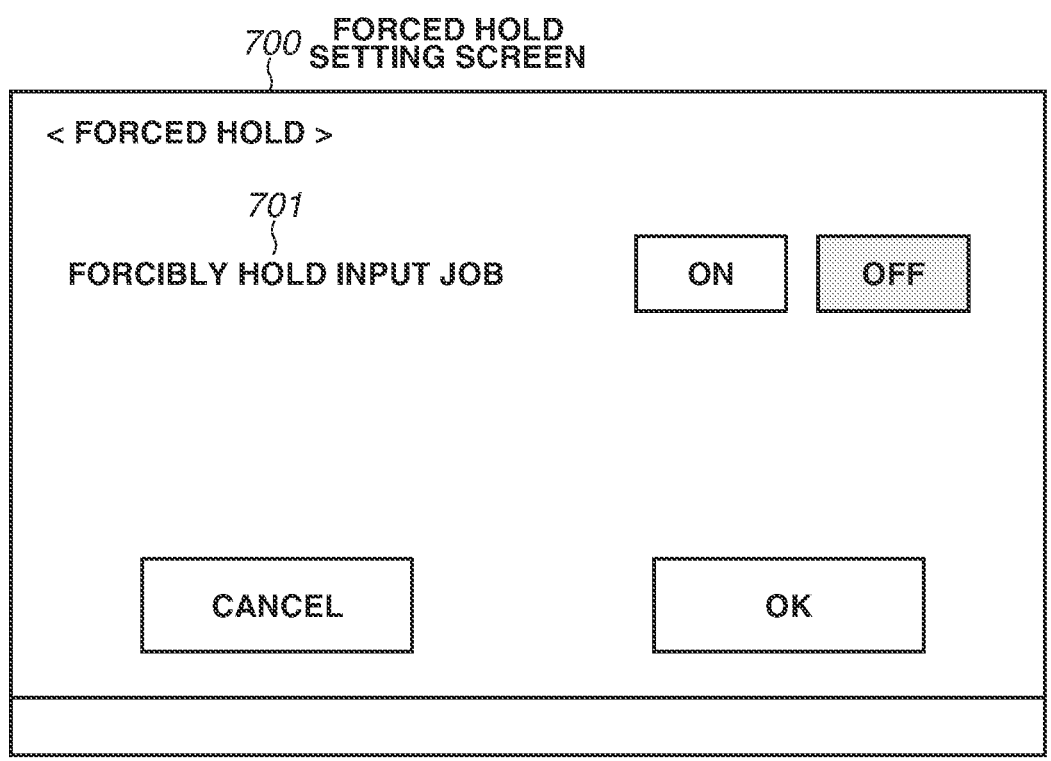
FIG. 7 is a diagram illustrating a forced hold setting screen.

A first setting is a setting whether "user account is automatically registered at the time of job input" described in FIG. 4A. A second setting is a setting whether "input job is forcibly held" in FIG. 7. These settings are previously set by the dedicated system administrator.

In a case where it is determined in step S901 that the setting of "user account is automatically registered at the time of job input" is ON (YES in step S901) and it is determined in step S902 that the setting of "input job is forcibly held" is ON (YES in step S902), the processing proceeds to step S903. In contrast, in a case where any of the settings is OFF (NO in step S901 or S902), the processing in FIG. 9 by the personal print application 310 ends.

In step S903, the personal print application 310 registers the callback function for user list acquisition in the login application 320. In step S904, the login application 320 receives registration request of the callback function for user list acquisition from the personal print application 310, and registers the callback function. The callback function is called by the login application 320 when login is performed by the icon selection method.

<Operation in Reception of Print Data>

Figure 10:
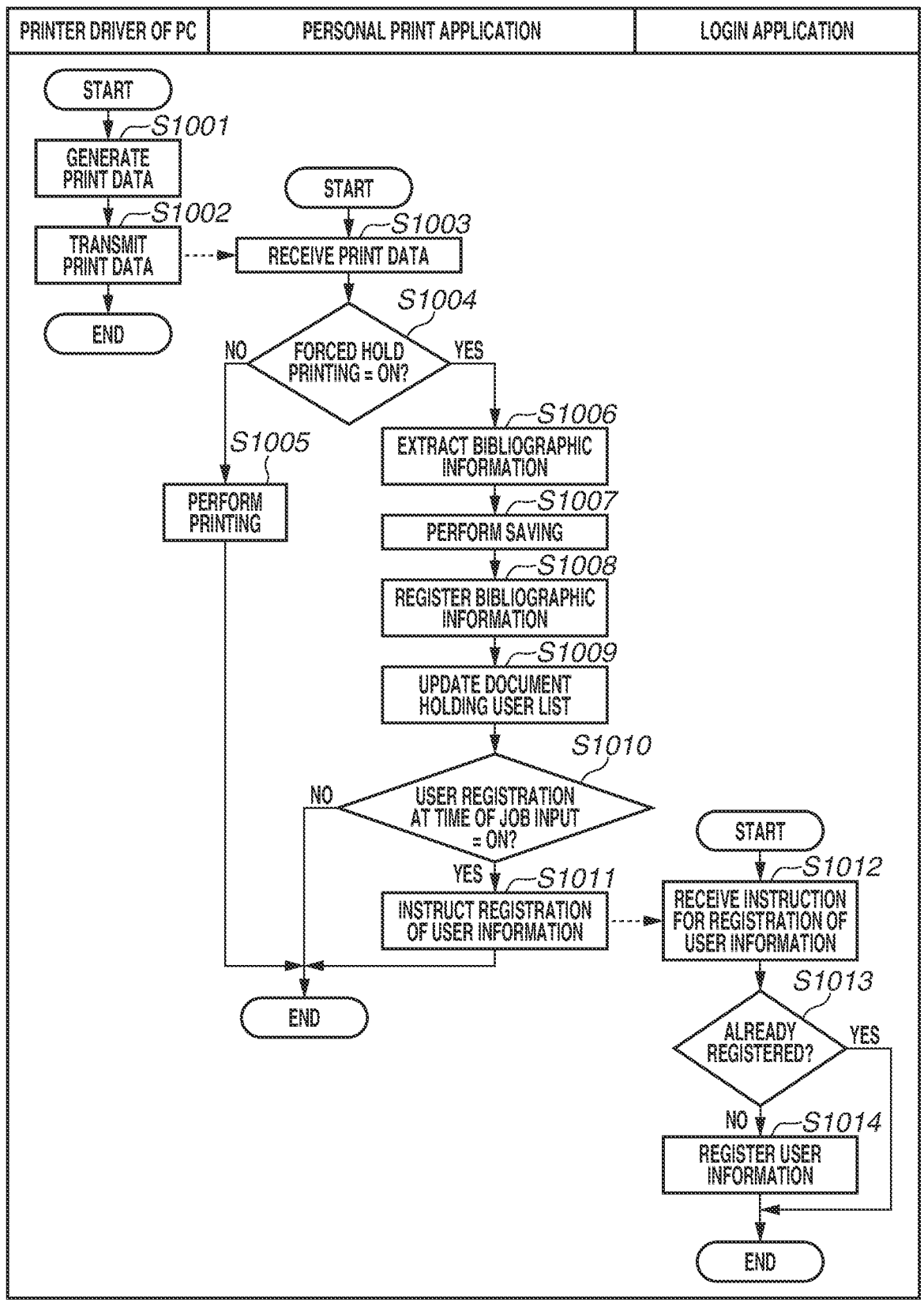
FIG. 10 is a diagram illustrating an operation flow when the MFP receives print data.

FIG. 10 is a flowchart for illustrating an operation when data transmitted from the PC 102 through the LAN 100 is accumulated or printed. Processing in steps S1001 and S1002 illustrated in the flowchart of FIG. 10 is executed by the PC 102. Processing in and after step S1003 is executed by the MFP 101. More specifically, a program for processing in and after step S1003 is held by the ROM 203 or the HDD 204 of the MFP 101, and is executed by the CPU 201.

In step S1001, the printer driver of the PC 102 is called when the print menu is displayed in various kinds of applications by the user, and displays a print setting screen (not illustrated). In a case where the printer driver receives a print instruction by the user in the print setting screen, the printer driver converts the application data into data printable by the MFP 101 to generate print data. In step S1002, the printer driver transmits the print data generated in step S1001 to the MFP 101.

In step S1003, the personal print application 310 operating in the MFP 101 receives the print data transmitted in step S1002 from the printer driver of the PC 102. In step S1004, the personal print application 310 acquires the setting of the MFP 101 and checks the setting indicating whether "input job is forcibly held" in FIG. 7. The setting is previously set by the dedicated system administrator. In a case where the setting is disabled (NO in step S1004), the processing proceeds to step S1005, and the personal print application 310 executes the print control. As a result, the received print data is rasterized into bitmap image data by the raster image processor 210, and the bit map image data is output to the printer unit 212 through the printer interface 211. The printer unit 212 performs printing on a sheet based on the output data.

In a case where the setting of "input job is forcibly held" is enabled (YES in step S1004), the processing proceeds to step S1006. In step S1006, the personal print application 310 acquires, from the print data received in step S1003, the bibliographic information including the owner name (owner information), a document name of the print data, a reception date of the print data, and print setting information set by the user. In step S1007, the personal print application 310 saves, in the HDD 204 of the MFP 101, the print data from which the bibliographic information has been normally extracted, as the held document. The print data to be saved may be stored as page description language data or as bitmap image data rasterized by the raster image processor 210.

In step S1008, the personal print application 310 saves, in the HDD 204 of the MFP 101, the bibliographic information acquired in step S1006 in association with the owner name of the print data acquired from a header of the print data. In step S1009, the personal print application 310 adds the owner name acquired in step S1006 to the top of the document holding user list illustrated in FIG. 12. At this time, in a case where the user of the same owner name has been already registered in the document holding user list, the user is moved to the top of the document holding user list.

Further, the number of held jobs and the number of unprinted jobs of the user in the document holding user list are updated.

In step S1010, the personal print application 310 acquires the setting of the MFP 101, and checks whether the setting of "user account is automatically registered at job input" illustrated in FIG. 4A is enabled. In a case where it is determined that the setting is enabled (YES in step S1010), the processing proceeds to step S1011, and the personal print application 310 instructs the login application 320 to register the owner name acquired in step S1006 in the user table managed by the login application 320.

When the login application 320 receives the registration instruction from the personal print application 310 in step S1012, the processing proceeds to step S1013. In step S1013, the login application 320 determines whether the user name corresponding to the received owner name has been already registered in the user table. In a case where the user name has been already registered (YES in step S1013), the processing ends. In a case where the user name has not been registered (NO in step S1013), the received owner name is newly added to the item of the user name 1401 of the user table (FIG. 14).

The above is description of the operation when the MFP 101 receives the print data.

<Operation to Display Login Screen>

Figure 11:
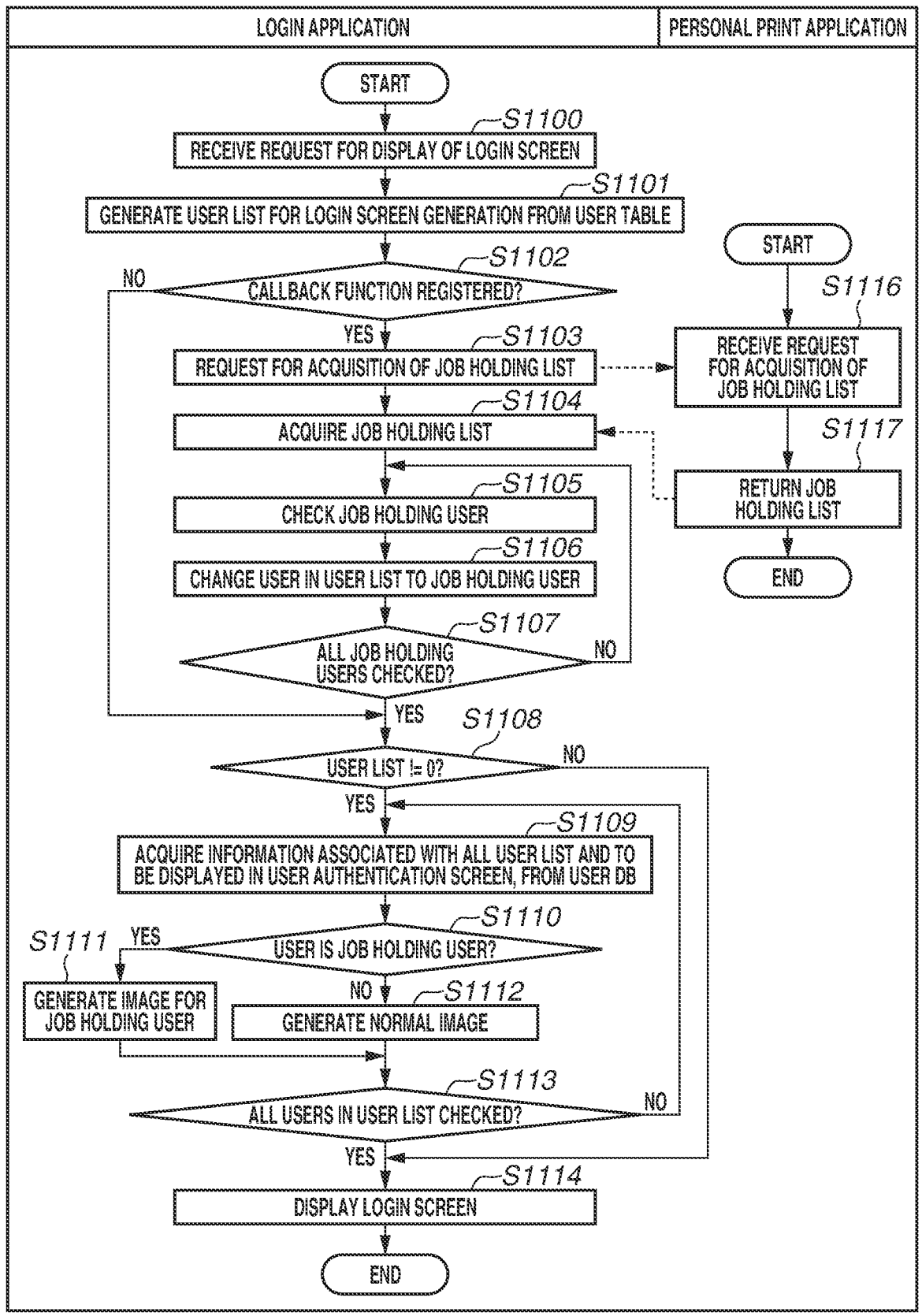
FIG. 11 is a diagram for illustrating a flow for the MFP in displaying a login screen.

FIG. 11 is a flowchart illustrating an operation when the login application 320 displays the login screen 410 on the operation unit 208. In the present exemplary embodiment, a method of displaying in an easy-to-understand manner whether the user holds the job in the login screen 410 is described. A program executing steps illustrated in the flowchart of FIG. 11 is held by the ROM 203 or the HDD 204 of the MFP 101. Further, the steps are executed by the CPU 201.

In step S1100, the login application 320 receives request for displaying the login screen. Next, in step S1101, the login application 320 generates a user list for login screen generation with use of the user table in the user management section 322. The user list for login screen generation is a list of users to be displayed in the login screen. The icon images and the user names of the respective users included in the user list are displayed in processing in step S1114 described below.

In step S1102, the login application 320 checks whether the callback function for user list acquisition has been registered by the personal print application 310. In a case where it is determined that the callback function for user list acquisition has been registered by the personal print application 310 (YES in step S1102), the processing proceeds to step S1103. In a case where it is determined that the callback function for user list acquisition has not been registered (NO in step S1102), the processing proceeds to step S1108.

In step S1103, the login application 320 uses the callback function registered in step S904 to request acquisition of the document holding user list, from the personal print application 310. In step S1116, the personal print application 310 receives the user list acquisition request transmitted in step S1103 from the login application 320. In step S1117, the personal print application 310 transmits the document holding user list illustrated in FIG. 12 to the login application 320.

In step S1104, the login application 320 acquires the document holding user list transmitted from the personal print application 310.

In step S1105, the login application 320 extracts the document holding user one by one in order from the top of the document holding user list acquired in step S1104 from the personal print application 310. Further, in step S1106, information of the user in the user list for login screen generation that has been generated in step S1101, is changed to a job holding user.

In step S1107, the login application 320 determines whether all of the job holding users listed in the job holding user list acquired in step S1104 have been checked. When the check of all the users has not been completed (NO in step S1107), the processing returns to step S1105, and the processing in step S1106 is performed on next job holding user. In contrast, when the check of all the job holding users has been completed (YES in step S1107), the processing proceeds to step S1108.

In step S1108, the login application 320 determines whether the number of records listed in the user list for login screen generation is zero. In a case where the number of records is determined as zero (NO in step S1108), the processing proceeds to step S1114. In a case where the number of records is equal to or larger than one (YES in step S1108), the processing proceeds to step S1109.

In step S1109, the login application 320 acquires, from the user table (FIG. 14), the user identification information associated with each of the users listed in the user list for login screen generation. The user identification information to be acquired corresponds to the user name 1401 and the icon image 1404 illustrated in FIG. 14.

In step S1110, the login application 320 determines whether each of the users listed in the user list for login screen generation is the job holding user. At this time, the information indicating whether the user is the job holding user, changed in step S1106 is used. In a case where the user is determined as the job holding user in step S1110 (YES in step S1110), the login application 320 generates the user icon image for job holding user with use of the user name 1401 and the icon image 1404 acquired in step S1109. In other words, the images of the user icons 411, 412, 413, and 415 illustrated in FIG. 4B are generated. In a case where the user is not determined as the job holding user (NO in step S1110), the login application 320 generates, in step S1112, a normal user icon image based on the user name 1401 and the icon image 1404 acquired in step S1109. In other words, the images of the user icons 414 and 416 illustrated in FIG. 4B are generated.

In step S1113, the login application 320 determines whether all of the users listed in the user list for login screen generation have been checked. When the check of all the users has not been completed (NO in step S1113), the processing returns to step S1109, and the processing in steps S1100 to S1112 is performed on next user. In contrast, in a case where the check of all the users has been completed (YES in step S1113), the processing proceeds to step S1114.

In step S1114, the login application 320 displays the login screen on the operation unit 208.

In a case where it is determined that the number of records listed in the user list for login screen generation is zero in step S1108 (NO in step S1108), the login screen without the user icon image is displayed in step S1114. In a case where it is determined that the number of records is equal to or larger than one, the login screen in which the user icon images generated in step S1111 or S1112 are arranged (see FIG. 4B) is generated and is displayed on the operation unit 208.

Although not illustrated in FIG. 11, the user presses the user icon in the displayed login screen to log in to the MFP 101 as the corresponding user. Further, when the document list screen (FIGS. 8A and 8B) is displayed while the user is logging in, only the documents of the user are displayed as a list, which allows the user to easily find own documents.

<Effects>

As described above, the printing apparatus according to the above-described exemplary embodiment acquires the information of the document holding user from the personal print application when displaying the login screen in the icon selection method. Further, the printing apparatus displays the login screen with the acquired information of the document holding user added. In other words, the user icon image is changed between the document holding users and the other users among the users registered in the user table, which allows the user to easily check presence/absence of the held job in the login screen. As a result, the user can check the state of the own job only by viewing the login screen, and can easily and quickly find unholding of the print data due to erroneous input of the job or forgetting of printing. This improves usability.

In FIG. 4B, the job holding users and the other users are distinguished by changing a color of the user icon image or adding a tag; however, other methods may be used as long as the user icon image allows for distinction of the users.

Next, a second exemplary embodiment is described. In the first exemplary embodiment, presence/absence of the print job is notified in the login screen 410. In contrast, in the second exemplary embodiment, information relating to the number of jobs held by the user is notified in the login screen 410. The print system 1 according to the second exemplary embodiment is similar to the print system according to the first exemplary embodiment except for a configuration part relating to the above-described difference. Accordingly, similar components are denoted by the same reference numerals, and detailed description thereof is omitted.

Figure 19:
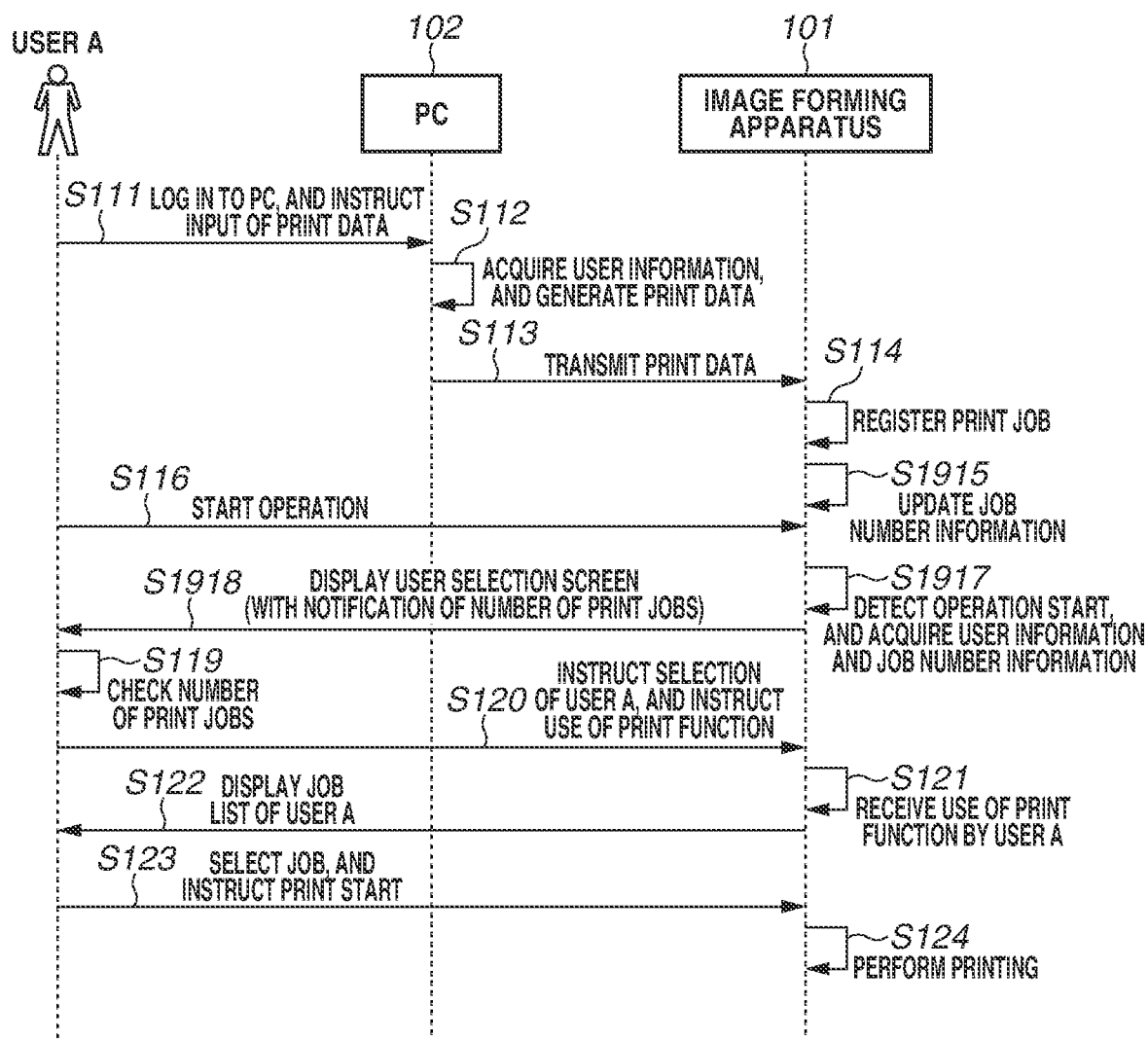
FIG. 19 is a diagram illustrating a sequence of a printing system according to the second exemplary embodiment.

A print processing sequence in the print system 1 according to the second exemplary embodiment is specifically described. FIG. 19 is a diagram illustrating the processing sequence in the print system 1 according to the second exemplary embodiment. In FIG. 19, the steps S115, S117, S118, and S119 in FIG. 1B are respectively replaced with S1915, S1917, S1918, and S1919. The replaced steps are described in detail.

In the processing sequence according to the second exemplary embodiment, the MFP 101 identifies the owner of the print data, and updates the job number information of the user (S1915). Thereafter, when an operation by the user A is detected, the MFP 101 acquires the user information and the job number information (S1917). The MFP 101 displays the user selection screen based on these information (S1918). The number of jobs held by the user is displayed so as to be identifiable. The user A checks the number of own jobs from the display state of the user selection screen (S1919).

As described above, according to the print system 1, the user can grasp the number of own jobs before selection of the user icon. Accordingly, the user can determine whether the job has been newly registered only by viewing variation of the number of jobs. This makes it possible to reduce additional work created by erroneously displaying the job list in a state where the job to be newly registered is not registered.

In step S1104 of FIG. 11, the login application 320 acquires the document holding user list transmitted from the personal print application 310. As illustrated in FIG. 12, the document holding user list includes information about the number of held jobs and the number of unprinted jobs for each of the users. In the present exemplary embodiment, in step S1111 of FIG. 11, the login application 320 generates the user icon image with use of these information when generating the user icon image for job holding user.

Figure 15A:
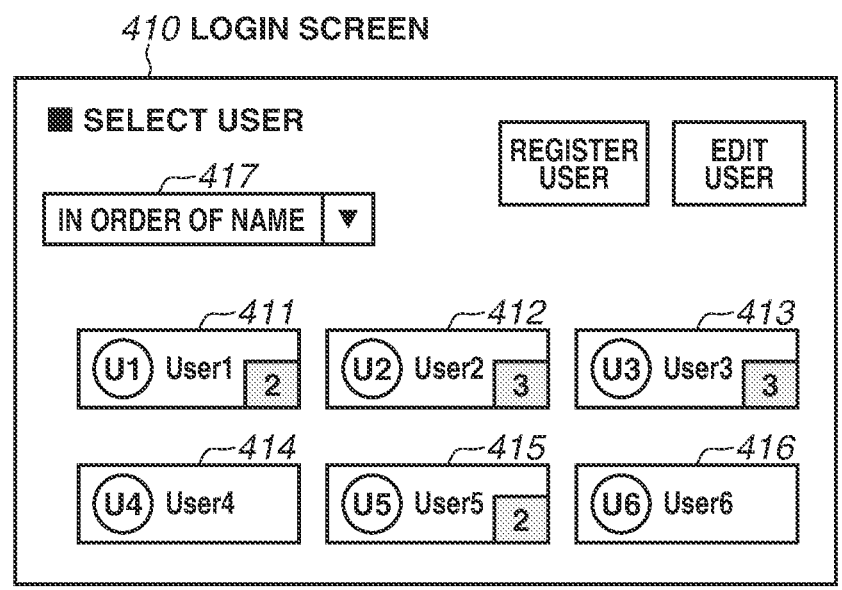
FIGS. 15A to 15F are diagrams each illustrating a login screen according to a second exemplary embodiment.
Figure 15B:
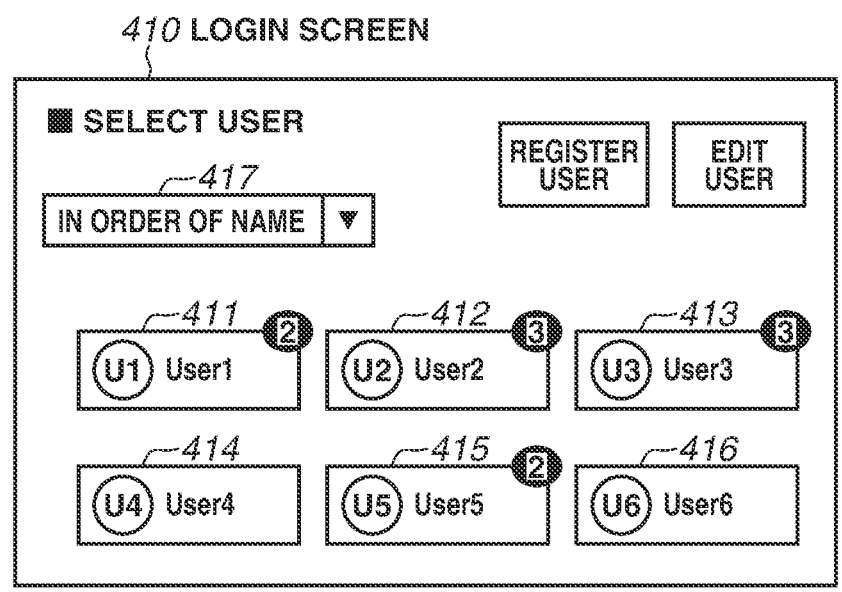
Figure 15C:
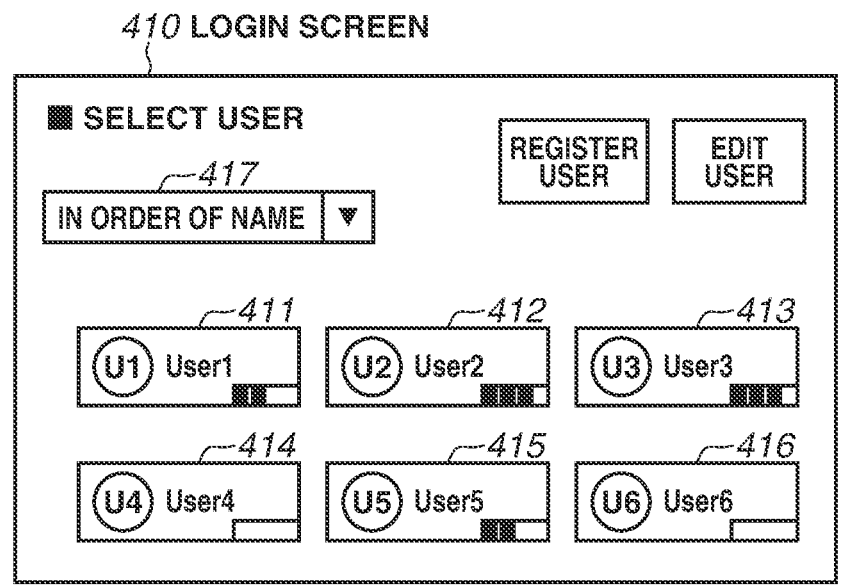
Figure 15D:
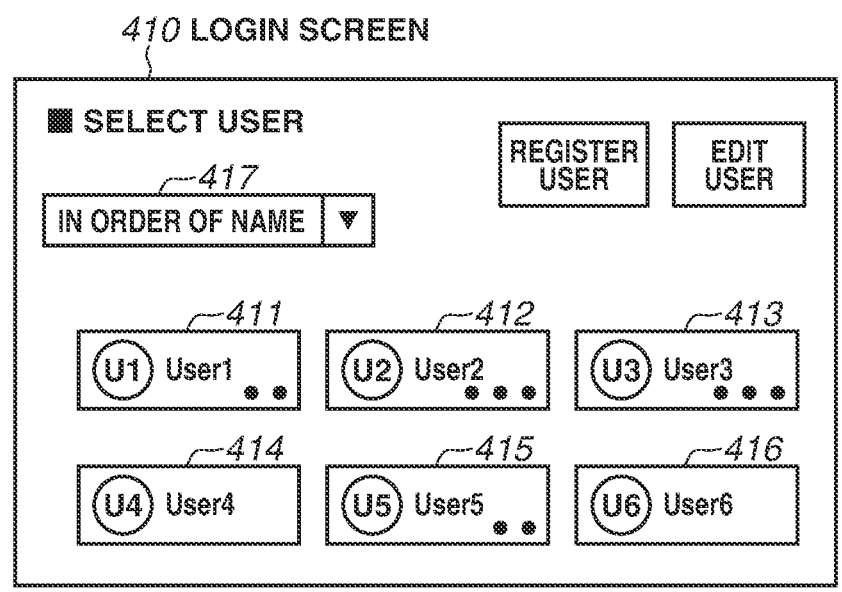
Figure 15E:
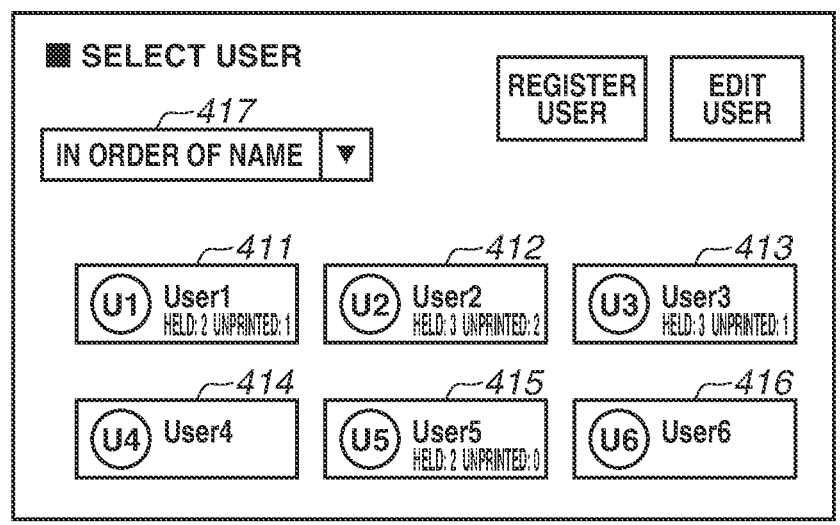
Figure 15F:
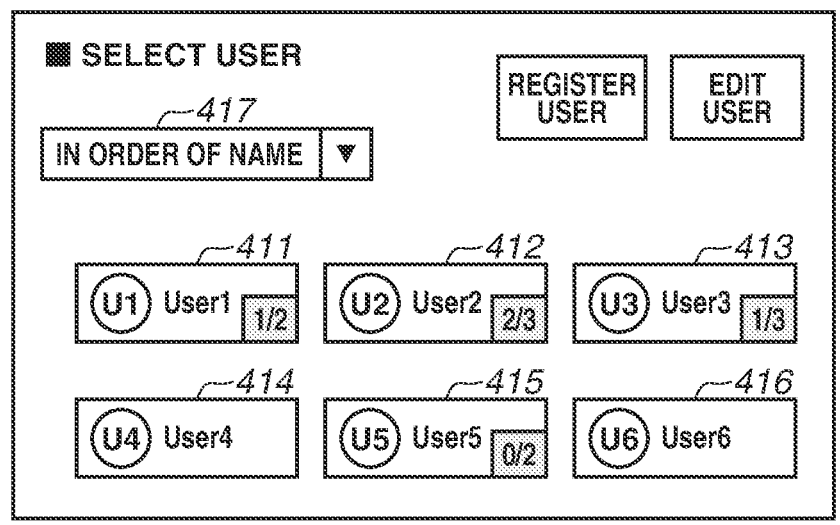

FIGS. 15A to 15F each illustrate an example of the login screen 410 generated in the present exemplary embodiment. FIGS. 15A to 15D each illustrate an example of the user icon image that is generated by synthesizing an image indicating the number of held jobs and the user icon. In FIG. 15A, a numeral indicating the number of held jobs is displayed at lower right of the user icon. In FIG. 15B, a numeral indicating the number of held jobs is displayed at upper right of the user icon. In FIG. 5C, a gauge image (mark) indicating the number of held jobs is displayed at lower right of the user icon. In FIG. 15D, a dot image indicating the number of held jobs is displayed at lower right of the user icon. FIGS. 15E and 15F each illustrate an example of the user icon image that is generated by synthesizing an image indicating the number of held jobs and the number of unprinted jobs, and the user icon. In FIG. 15E, numerals indicating the number of held jobs and the number of unprinted jobs are displayed at lower right of the user icon. In FIG. 15F, a numeral indicating the number of held jobs and the number of unprinted jobs in a form of "number of unprinted jobs/number of held jobs" is displayed at lower right of the user icon. These are display examples of the login screen 410, and the display form, the display position, and the number of information to be displayed are not limited thereto as long as the number of held jobs and the number of unprinted jobs are checkable.

Further, the number of jobs to be displayed is not limited to the number of held jobs and the number of unprinted jobs. The number of jobs to be displayed may be the number of read jobs indicating the number of jobs that have been checked by the user through the document list of FIGS. 8A and 8B, or the number of unchecked unread jobs. Further, the number of jobs to be displayed is not limited to the number of documents for hold printing managed by the personal print application. The number of untransmitted jobs that have not been transmitted even though the user performs transmission processing through the transmission application 302, or the number of jobs saved by the user in the box of the box application 303 may be displayed.

Figure 16:
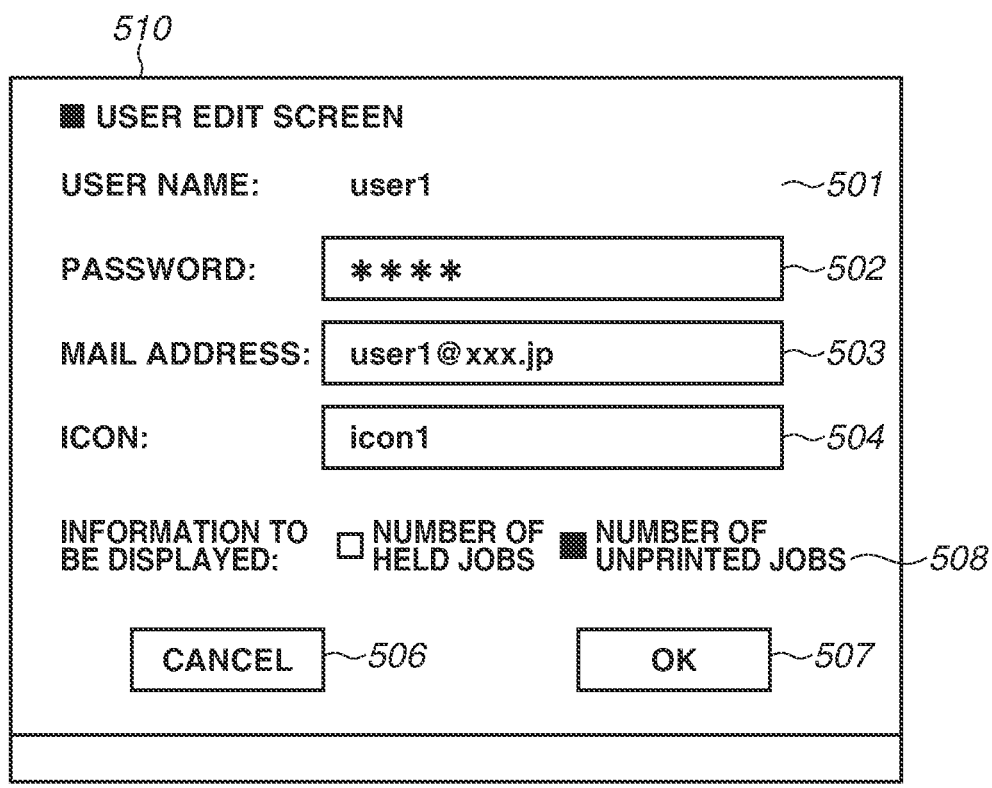
FIG. 16 is a diagram illustrating a user account edit screen according to the second exemplary embodiment.

Further, as illustrated in setting 508 of FIG. 16, the number of to be displayed may be selected by the user in the user edit screen. In other words, the setting may be changed for each user.

Furthermore, the form to be displayed in the login screen 410 may be changed based on the user account information (e.g., authority information) registered in the user table illustrated in FIG. 14. For example, in a case where the authority information of the user account information is "Administrator", the number of jobs may not be displayed.

<Effects>

As described above, the printing apparatus in the above-described exemplary embodiment displays the login screen added with the job information relating to the users when displaying the login screen in the icon selection method. As a result, the user can check the state of jobs, the number of held jobs, and the number of unprinted jobs only by viewing the login screen, which further improves usability, for example, confirmation of the number of jobs left unprinted.

A third exemplary embodiment of the present invention is described. In the first and second exemplary embodiments, presence/absence and the number of jobs are notified irrespective of a sort order of the user icons. In the third exemplary embodiment, notification of presence/absence and the number of jobs are changed depending on the sort order. The print system according to the third exemplary embodiment is similar to the print system according to the first and second exemplary embodiments except for the above part relating to the above-described difference. Accordingly, similar components are denoted by the same reference numerals, and detailed description thereof is omitted.

In the present exemplary embodiment, a method in which information relating to sort information is displayed together in a case where the sort is performed by the sort button 417 in the login screen 410 (FIG. 4B), is described.

Figure 18:
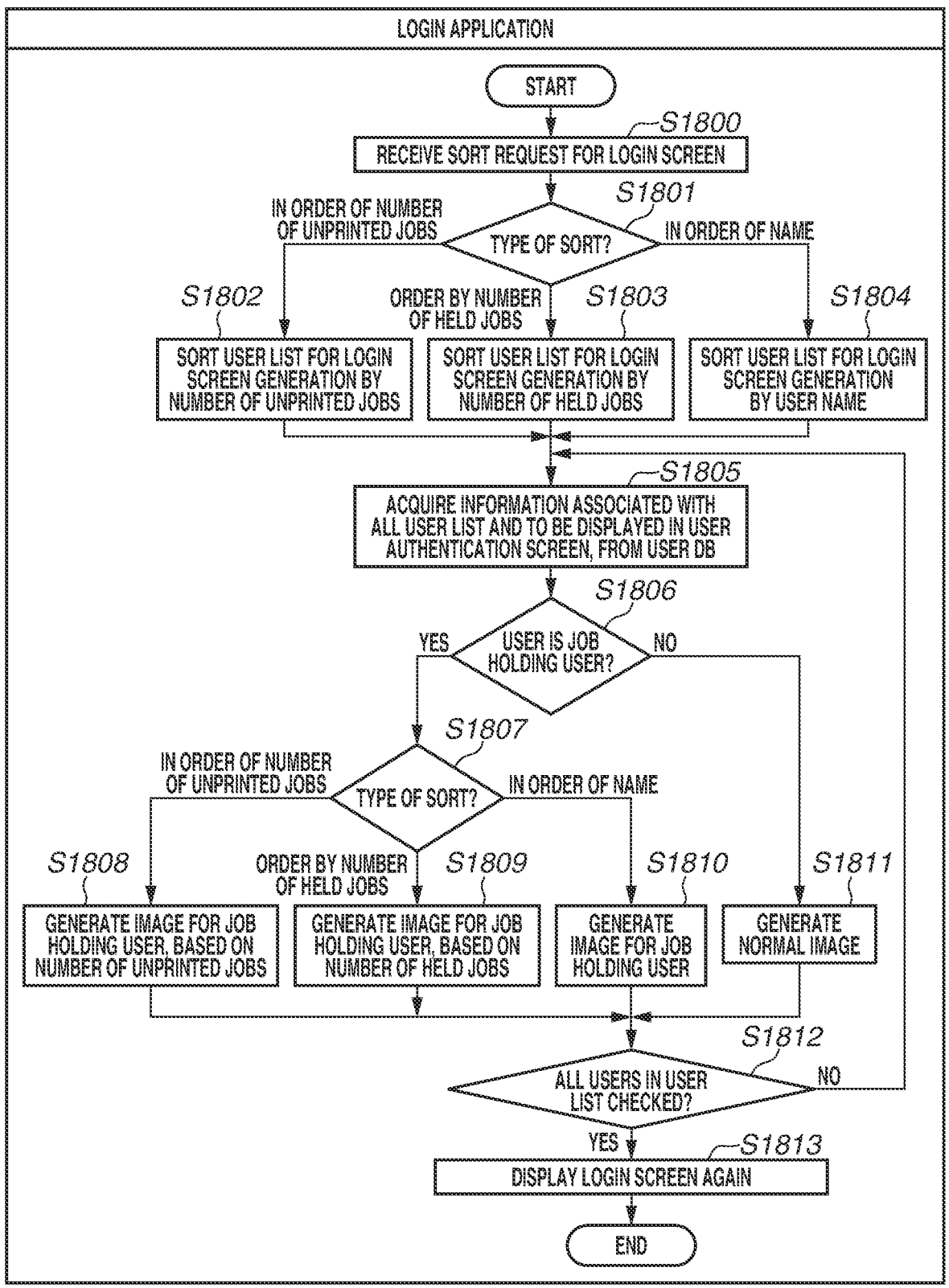
FIG. 18 is a diagram illustrating a flow of sort operation for the login screen of the MFP.

FIG. 18 is a flowchart illustrating operation when the login application 320 receives sort request for the user icons to be displayed in the login screen displayed on the operation unit 208. The processing in FIG. 18 is performed in a case where the login application 320 receives the sort request through pressing of the sort button 417 in the login screen 410 after the login screen of FIG. 4B has been displayed in step S1114 of FIG. 11. It is assumed that the user list for login screen generation has been already generated in step S1101 of FIG. 11. Further, it is assumed that, in step S1106 of FIG. 11, the number of held jobs and the number of unprinted jobs in the job holding list (FIG. 12) acquired from the personal print application 310 are held as an attribute of each user in the user list. Further, it is assumed that, as a type of the sort, "in order of name", "in order of number of held jobs", and "in order of number of unprinted jobs" are selectable. A program executing steps illustrated in the flowchart of FIG. 18 is held by the ROM 203 or the HDD 204 of the MFP 101. Each step is executed by the CPU 201.

In step S1800, the login application 320 receives sort request. In step S1801, the login application 320 checks a type of the sort request. When the login application 320 determines in step S1802 that the type of the sort request is "in order of number of held jobs" (in order of number of held jobs in step S1801), the processing proceeds to step S1803, and the login application 320 performs the sort processing on the user list for login screen generation, based on the number of held jobs. When the login application 320 determines in step S1801 that the type of the sort request is "in order of number of unprinted jobs" (in order of number of unprinted jobs in step S1801), the processing proceeds to step S1802, and the login application 320 performs the sort processing on the user list for login screen generation, based on the number of unprinted jobs. When the login application 320 determines in step S1801 that the type of sort request is "in order of name" (in order of name in step S1801), the processing proceeds to step S1804, and the login application 320 performs the sort processing on the user list for login screen generation, based on the user name. The arrangement order (layout) of the icons are determined after execution of the sort processing.

Next, in step S1805, the login application 320 acquires, from the user table (FIG. 14), the user identification information associated with each of the users listed in the user list for login screen generation. The user identification information to be acquired corresponds to the user name 1401 and the icon image 1404 illustrated in FIG. 14.

In step S1806, the login application 320 determines whether each of the users listed in the user list for login screen generation is the job holding user. In a case where the user is determined as the job holding user in step S1806 (YES in step S1806), the login application 320 checks, in step S1807, the type of the sort request received in step S1800. When the login application 320 determines in step S1807 that the type of the sort request is "in order of number of held jobs" (in order of number of held jobs in step S1807), the processing proceeds to step S1809, and the login application 320 generates the user icon image for job holding user, based on the number of held jobs. When the login application 320 determines in step S1807 that the type of the sort request is "in order of number of unprinted jobs" (in order of number of unprinted jobs in step S1807), the processing proceeds to step S1808, and the login application 320 generates the user icon image for job holding user, based on the number of unprinted jobs. When the login application 320 determines in step S1807 that the type of the sort request is "in order of name" (in order of name in step S1807), the processing proceeds to step S1810, and the login application 320 generates the user icon image for job holding user in a manner similar to step S1111 in FIG. 11. In a case where the user is not determined as the job holding user in step S1806 (NO in step S1806), the login application 320 generates, in step S1811, a normal user icon image from the user name 1401 and the icon image 1404 acquired in step S1805.

In step S1812, the login application 320 determines whether all of the users listed in the user list for login screen generation have been checked. When the check has not been completed (NO in step S1802), the processing returns to step S1805, and the processing in steps S1805 to S1811 is performed on next user. In contrast, when check for all of the users has been completed (YES in step S1812), the processing proceeds to step S1813.

In step S1813, the login application 320 displays the login screen on the operation unit 208.

Figure 17A:
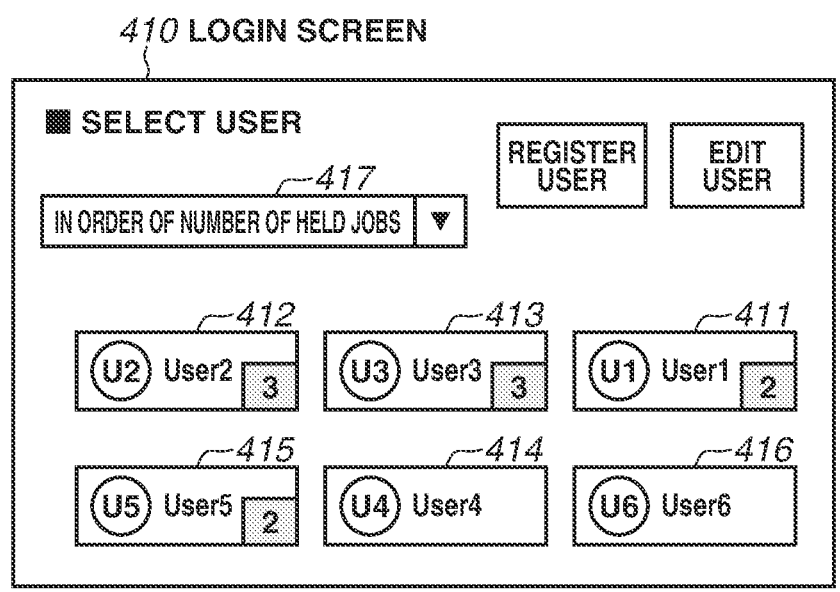
FIGS. 17A and 17B are diagrams each illustrating a login screen according to a third exemplary embodiment.
Figure 17B:
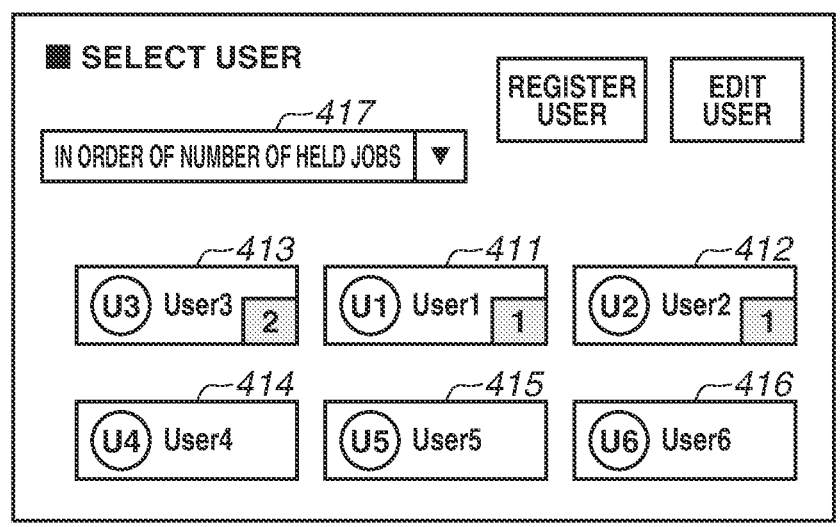

FIGS. 17A and 17B illustrate examples of the login screen when the sort processing is performed "in order of number of held jobs" and "in order of number of unprinted jobs", respectively. FIG. 17A illustrates the example in the case where the sort request "in order of number of held jobs" has been received. The user icons to be displayed are sorted "in order of number of held jobs", and in this case, the number of held jobs is displayed in each of the user icons. FIG. 17B illustrates the example in the case where the sort request "in order of number of unprinted jobs" has been received. The user icons to be displayed are sorted "in order of number of unprinted jobs", and in this case, the number of unprinted jobs is displayed in each of the user icons. There are various methods of displaying the number of jobs as illustrated in FIGS. 15A to 15F, and the method is not limited to the display method of FIGS. 17A and 17B.

In the present exemplary embodiment, the sort processing is performed "in order of number of held jobs" and "in order of number of unprinted jobs"; however, the sort processing may be performed based on other type of sort. In addition, even in a case where the button 417 of the login screen 410 is not the sort button but a filter button, the information to be together displayed may be changed depending on a type of the filter in a similar manner.

As described above, in the case where the printing apparatus according to the above-described exemplary embodiment receives the sort request of the user icons when displaying the login screen in the icon selection method, the printing apparatus displays the login screen with the information of jobs associated with each user added depending on the type of the sort request. This allows the user to check the state of job and the number of jobs associated with the sort request, and usability is accordingly further improved.

Other Exemplary Embodiment

The present invention can be achieved by supplying a program for implementing one or more functions of the above-described exemplary embodiments to a system or an apparatus through a network or a storage medium, and causing one or more processors in a computer of the system or the apparatus to read and execute the program. Further, the present invention can be achieved by a circuit (e.g., application specific integrated circuit (ASIC)) that achieves one or more of the functions.

Moreover, the present invention may be applied to a system including a plurality of devices or to an apparatus including only one device.

The present invention is not limited to the above-described exemplary embodiments, and various modifications (including organized combinations of exemplary embodiments) may be made based on purport of the present invention and are not eliminated from the scope of the present invention. In other words, the configurations obtained by combining the above-described exemplary embodiments and the modifications are all included in the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-235539, filed Dec. 7, 2017, which is hereby incorporated by reference herein in its entirety.

What is claimed is:

1. An image forming apparatus comprising:
a display;
at least one memory; and
at least one processor that executes instructions stored in the memory to configure the image forming apparatus to,
acquire user information associated with an object selected in a user selection screen in which a plurality of objects associated with user information is arranged,
display, on the display, a printing screen presenting a list of held print jobs that can be printed according to an instruction and is associated with the acquired user information, and
control the image forming apparatus such that each object arranged in the user selection screen is displayed in a manner that facilitates recognizing a number of print jobs that a user corresponding to the object has set to be held, and such that in a case where the objects arranged in the user selection screen include an object of a non-holding user who has not set any print job to be held, the object of the non-holding user is displayed in a manner that facilitates recognizing that the non-holding user has not set any print job to be held.

2. The image forming apparatus according to claim 1, wherein the held print jobs includes printed data and unprinted data of the print data associated with the user who has set the held print jobs to be held.

3. The image forming apparatus according to claim 2, further comprising a count unit configured to count a number of pieces of the printed data and a number of the unprinted data associated with the user who has set the held print jobs to be held,
wherein the control unit performs control relating to the notification based on the count.

4. The image forming apparatus according to claim 1, wherein the held print jobs does not include printed data but includes unprinted data of the print data associated with the user who has set the held print jobs to be held.

5. The image forming apparatus according to claim 4, further comprising a count unit configured to count a number of pieces of the unprinted data associated with the user who has set the held print jobs to be held,
wherein the control unit performs control relating to the notification based on the counted number.

6. The image forming apparatus according to claim 1, further comprising a reception unit configured to receive a setting to notify the information relating to the number of pieces of held print jobs.

7. The image forming apparatus according to claim 6, wherein the reception unit can receive the setting for each user.

8. The image forming apparatus according to claim 1, wherein the information relating to the number of pieces of held print jobs is notified by a numeral in the notification.

9. The image forming apparatus according to claim 1, wherein the information relating to the number of pieces of held print jobs is notified by a mark in the notification.

10. The image forming apparatus according to claim 1,
wherein the user selection screen notifies information relating to number of pieces of print data corresponding to each of the plurality of objects, and
wherein a layout of the plurality of objects is decided based on the number of pieces of print data for each user.

11. The image forming apparatus according to claim 1, wherein the user information is a user identification (ID).

12. The image forming apparatus according to claim 11, wherein a name of the user ID is displayed in the object associated with the user information.

13. A method of controlling an image forming apparatus that comprises a display, at least one memory, and at least one processor that executes instructions stored in the memory to configure the image forming apparatus, the method comprising,
acquiring user information associated with an object selected in a user selection screen in which a plurality of objects associated with user information is arranged,
displaying, on the display, a printing screen presenting a list of held print job that can be printed according to an instruction and is associated with the acquired user information, and controlling the image forming apparatus such that each object arranged in the user selection screen is displayed in a manner that facilitates recognizing a number of print jobs that a user corresponding to the object has set to be held, and such that in a case where the objects arranged in the user selection screen include an object of a non-holding user who has not set any print job to be held, the object of the non-holding user is displayed in a manner that facilitates recognizing that the non-holding user has not set any print job to be held.

14. The control method according to claim 13, wherein the specific print data includes printed data and unprinted data of the print data associated with the user who has set the held print jobs to be held.

15. The control method according to claim 14, further comprising counting a number of pieces of printed data and a number of unprinted data associated with the user who has set the held print jobs to be held,
wherein the control relating to the notification is performed based on the counted number.

16. The control method according to claim 13, wherein the held print jobs does not include printed data but includes unprinted data of the print data associated with the user who has set the held print jobs to be held.

17. The control method according to claim 16, further comprising counting a number of pieces of unprinted data associated with the user who has set the held print jobs to be held,
wherein the control relating to the notification is performed based on the counted number.

18. The control method according to claim 13, further comprising receiving a setting relating to whether to notify the information relating to the number of pieces of held print jobs.

19. The control method according to claim 18, wherein the setting is receivable for each user.

20. The control method according to claim 13, wherein the information relating to the number of pieces of held print jobs is notified by a numeral in the notification.

21. The control method according to claim 13, wherein the information relating to the number of pieces of held print jobs is notified by a mark in the notification.

22. The control method according to claim 13,
wherein the user selection screen notifies information relating to a number of pieces of print data corresponding to each of the plurality of objects, and
wherein a layout of the plurality of objects is decided based on the number of pieces of print data for each user.

23. The control method according to claim 13, wherein the user information is a user identification (ID).

24. The control method according to claim 23, wherein a name of the user ID is displayed in the object associated with the user information.

25. A non-transitory computer-readable storage medium holding a program for a method of controlling an image forming apparatus that comprises a display, at least one memory, and at least one processor that executes instructions stored in the memory to configure the image forming apparatus, the method comprising,
acquiring user information associated with an object selected in a user selection screen in which a plurality of objects associated with user information is arranged,
displaying, on the display, a printing screen presenting a list of held print job that can be printed according to an instruction and is associated with the acquired user information, and
controlling the image forming apparatus such that each object arranged in the user selection screen is displayed in a manner that facilitates recognizing a number of print jobs that a user corresponding to the object has set to be held, and such that in a case where the objects arranged in the user selection screen include an object of a non-holding user who has not set any print job to be held, the object of the non-holding user is displayed in a manner that facilitates recognizing that the non-holding user has not set any print job to be held.

* * * * *